(12) United States Patent
Kawase et al.

(10) Patent No.: US 11,101,494 B2
(45) Date of Patent: Aug. 24, 2021

(54) BATTERY ASSEMBLY MANUFACTURING METHOD

(71) Applicant: Toyota Jidosha Kabushiki Kaisha, Toyota (JP)

(72) Inventors: Satomi Kawase, Nishikamo-gun (JP); Tomohiro Matsuura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 86 days.

(21) Appl. No.: 16/397,612

(22) Filed: Apr. 29, 2019

(65) Prior Publication Data

US 2019/0252715 A1 Aug. 15, 2019

Related U.S. Application Data

(62) Division of application No. 12/670,154, filed as application No. PCT/JP2008/062958 on Jul. 17, 2008, now abandoned.

(30) Foreign Application Priority Data

Jul. 23, 2007 (JP) ................. 2007-191445

(51) Int. Cl.
*H01M 10/04* (2006.01)
*H01M 10/42* (2006.01)
*H01M 50/20* (2021.01)

(52) U.S. Cl.
CPC ... *H01M 10/0481* (2013.01); *H01M 10/0404* (2013.01); *H01M 10/0431* (2013.01);
(Continued)

(58) Field of Classification Search
None
See application file for complete search history.

(56) References Cited

U.S. PATENT DOCUMENTS

| 6,174,618 B1 | 1/2001 | Nishiyama et al. |
| 6,203,938 B1 | 3/2001 | Yoshida et al. |

(Continued)

FOREIGN PATENT DOCUMENTS

| JP | 2001-57196 A | 2/2001 |
| JP | 2001-167745 A | 6/2001 |

(Continued)

OTHER PUBLICATIONS

Decision of Refusal for Korean Appl. No. 10-2010-7003797 dated Mar. 21, 2012.

*Primary Examiner* — Maria Laios
(74) *Attorney, Agent, or Firm* — Finnegan, Henderson, Farabow, Garrett & Dunner, LLP

(57) ABSTRACT

A method for manufacturing a battery assembly provided by the present invention includes a step of measuring a stacking direction length of a stacked body including a predetermined number of unit cells (12) constituting a battery assembly (10) and arranged in the stacking direction; and a step of bundling a body (20) to be bundled that includes the stacked body. Here, the body to be bundled is provided with length adjusting means (40) for converging a spread in stacking direction length. The bundling step is implemented by setting the length adjusting means according to the stacking direction length of the stacked body, so that a length of the battery assembly in the stacking direction is a stipulated length (LT) and a bundling pressure of the body to be bundled is a stipulated pressure.

4 Claims, 11 Drawing Sheets

(52) U.S. Cl.
CPC ....... *H01M 10/4285* (2013.01); *H01M 50/20* (2021.01); *Y10T 29/49108* (2015.01)

(56) References Cited

U.S. PATENT DOCUMENTS

| | | |
|---|---|---|
| 6,275,003 B1 | 8/2001 | Marukawa et al. |
| 6,509,114 B1 | 1/2003 | Nakai et al. |
| 2005/0079407 A1 | 4/2005 | Higashino et al. |
| 2005/0233214 A1* | 10/2005 | Marple .................. H01M 6/16 429/221 |
| 2006/0246348 A1 | 11/2006 | Hamada et al. |
| 2006/0269842 A1 | 11/2006 | Ichinose et al. |
| 2011/0206975 A1* | 8/2011 | Ichinose ................ H01M 4/80 429/152 |

FOREIGN PATENT DOCUMENTS

| | | |
|---|---|---|
| JP | 2001-319677 A | 11/2001 |
| JP | 2004-055446 A | 2/2004 |
| JP | 2004-227788 A | 8/2004 |
| JP | 2004-259485 A | 9/2004 |
| JP | 2005-5167 A | 1/2005 |
| JP | 2005-116438 A | 4/2005 |
| JP | 2005-339925 A | 12/2005 |

\* cited by examiner

BATTERY ASSEMBLY MANUFACTURING METHOD

The present application is a divisional of U.S. application Ser. No. 12/670,154, which is a national phase application of International Application No. PCT/JP2008/062958, filed Jul. 17, 2008, which claims priority based on Japanese Patent Application No. 2007-191445 filed on Jul. 23, 2007, the contents of each of which are incorporated herein by reference.

TECHNICAL FIELD

The present invention relates to a method for manufacturing a battery assembly in which a plurality of unit cells (typically, secondary batteries) are arranged, and more particularly to a method for manufacturing a battery assembly suitable for installation on a vehicle.

BACKGROUND ART

Battery assemblies in which power storage elements such as lightweight lithium ion batteries making it possible to obtain a high energy density, nickel hydrogen batteries, and other secondary batteries or capacitors, are used as unit cells and a plurality of unit cells are connected in series have gained importance as power sources that can produce a high output in applications as power sources for installation on automobiles or power sources for personal computers and portable terminals. For example, Patent Document 1 discloses, as an example of a battery assembly for installation on a vehicle, a battery assembly configured by arranging a plurality of unit cells of the same shape composed of nickel hydrogen secondary batteries and connecting the unit cells in series. Patent Document 2 is another example of the related art document that relates to a battery assembly.

Battery assemblies in which a plurality of lightweight lithium ion batteries making it possible to obtain a high energy density is connected as unit cells in series are expected to be used especially advantageously as high-output power sources for installation on vehicles.

Patent Document 1: Japanese Patent Application Laid-Open No. 2001-57196

Patent Document 2: Japanese Patent Application Laid-Open No. 2005-5167

In addition to a limited installation space, battery assemblies that are installed on vehicles such as automobiles are presumed to be used in a state in which vibrations are generated. Therefore, for example, as also described in Patent Document 1, battery assemblies are constructed by arranging and bundling a large number of unit cells (that is, the unit cells are fixed to each other). Such bundling is conducted so that the arranged unit cell group be bundled by an appropriate bundling pressure (compressive pressure). In order to stabilize the performance (quality) of battery assemblies, it is preferred that a "spread" in the bundling pressure among the manufactured battery assemblies (products) be reduced.

However, there is generally a certain spread in the outer shape (for example, a thickness in the arrangement direction) of individual unit cells used to construct a battery assembly. Where a large number of unit cells that have such as spread in thickness are arranged in the stacking direction, the spread in thickness of the unit cells is accumulated. As a result, the length of the entire bundling object (body to be bundled) that includes the arranged unit cells in the stacking direction (arrangement direction) has a spread equal to or larger than the spread in thickness of individual unit cells. Where the body to be bundled is bundled by applying the stipulated bundling pressure, without regard for the spread in the stacking direction length of the body to be bundled, a spread occurs in the length of the obtained battery assembly in the stacking direction, this spread reflecting the spread (unevenness) of the stacking direction length of the body to be bundled. For example, the stacking direction length of the battery assembly in which the body to be bundled that has a relatively large stacking direction length is bundled by the stipulated bundling pressure is larger than the stacking direction length of the battery assembly in which the body to be bundled that has a relatively small stacking direction length is bundled under the same bundling pressure.

When the battery assemblies are installed on vehicles, this spread in the stacking direction length (outer size) of the battery assemblies causes inconveniences, for example, the battery assembly cannot be accommodated in the installation space that has been prepared in advance or an extra gap remains when the battery assembly is accommodated in the gap. Therefore, in the manufacture of battery assemblies, it is desirable not only to reduce the spread in bundling pressure of the battery assemblies, but also to reduce the spread in stacking direction length.

DISCLOSURE OF THE INVENTION

Accordingly, it is an object of the present invention to provide a method for manufacturing with good efficiency a battery assembly in which a plurality of unit cells are bundled by the preset (stipulated) bundling pressure and which has a preset accurate size (in particular, a length dimension of the battery assembly in the stacking direction of the unit cells constituting the battery assembly). Another object of the present invention is to provide a battery assembly obtained by this manufacturing method and a vehicle provided with the battery assembly.

The present invention provides a method for manufacturing a battery assembly in which a predetermined number of unit cells (typically, secondary batteries) are arranged in a stacking direction. This method includes a step of preparing a plurality of unit cells (for example, the unit cells may be manufactured from components or semi-products or may be prepared by purchasing or the like). Further, the method includes a step of measuring a stacking direction length L1 of a stacked body including the predetermined number of the unit cells arranged in the stacking direction. The method also includes a step of bundling a body to be bundled that includes the stacked body. The body to be bundled includes length adjusting means for converging a spread in stacking direction length L1. The bundling step is implemented by setting the length adjusting means according to the length L1, so that a length of the battery assembly in the stacking direction is a stipulated length LT and a bundling pressure of the body to be bundled is a stipulated pressure (stipulated bundling pressure) P.

The "unit cells" as referred to in the present description is a term indicating individual power storage elements constituting a battery assembly and includes batteries and capacitors of various compositions, unless specifically stated otherwise. Further, the term "secondary battery" refers generally to batteries that can be repeatedly charged and discharged and covers the so-called storage batteries such as a lithium ion battery and a nickel hydrogen battery. A power storage element constituting a lithium ion battery is a typical example of a configuration included in the definition of "unit cell" referred to herein, and a lithium ion battery module constituted by a plurality of such unit cells is a typical example of "battery assembly" disclosed herein. The technique disclosed herein can be applied especially advantageously to a battery assembly in which a predetermined number of unit cells (for example, lithium ion batteries) having a flat outer shape are arranged in a direction in which the flat planes are placed one on another (stacking direction) and the electrode terminals of these unit cells are connected in series or parallel.

In the battery assembly manufacturing method of the above-described configuration, a predetermined number of unit cells (typically, a predetermined number of unit cells of the same shape) that are used to constitute the battery assembly are stacked, a stacking direction length L1 of the stacked body is measured, and the length adjusting means is set so as to converge a spread in length L1 and realize the stipulated length LT and stipulated pressure P on the basis of the length L1. The stacking direction length L1 is measured as a length of all the constituent elements of the stacked body (includes at least the predetermined number of unit cells, but also may include elements other that the unit cells that can constitute the body to be bundled, for example cooling plates sandwiched between the unit cells and an end plate disposed at one end of the stacked body, as described in Examples 1 to 9 below) and therefore can be measured with higher accuracy than the stacking direction length of each constituent element. Therefore, with the above-described method, a battery assembly can be manufactured in which the bundling pressure of the entire body to be bundled and the stacking direction length of the battery assembly are matched with good accuracy with the stipulated values (stipulated length LT and stipulated pressure P). Further, because it is not necessary to measure successively the stacking direction length (that is, thickness) of each unit cell used to construct the battery assembly, a battery assembly with a small spread in bundling pressure and small spread in stacking direction length can be efficiently manufactured. Therefore, with the manufacturing method in accordance with the present invention, it is possible to provide a battery assembly suitable for installation on a vehicle or for other applications, this battery assembly being provided with good performance (quality) and external size (stacking direction length).

A spacer member that is arranged together with the stacked body in the stacking direction and constitutes the body to be bundled can be presented as a preferred example of the length adjusting means. The bundling step is implemented by setting the spacer member according to the length L1. Typically, a spacer member of an adequate size (stacking direction length, that is, thickness) is selected with consideration for the length L1, and the body to be bundled is formed by using the selected spacer member (that is, the length adjusting means is set). More specifically, a spacer member may be used of a thickness so as to make it possible to form a body to be bundled with a stacking direction length that constitutes the battery assembly of the stipulated length LT when the spread in length L1 is converged and the body to be bundled is bundled by the stipulated pressure (bundling pressure) P where the spacer member is arranged together with other constituent elements of the body to be bundled. It is preferred that a plurality of spacer members that differ at least in thickness be prepared in advance so that the spacer members of adequate thickness be disposed with good efficiency, or that a plurality of spacer members be used in combination to adjust the total thickness of these spacer members to the appropriate thickness. For example, a mode can be advantageously used in which the spacer members prepared in a sheet-like form and having a predetermined thickness are used in the number corresponding to the aforementioned length L1 (in addition to the constituent elements of the body to be bundled).

An end plate disposed in at least one stacking end of the body to be bundled and configured so that a length thereof in the stacking direction can be changed can be presented as another preferred example of the length adjusting means. The bundling step is typically implemented by adjusting the stacking direction length (that is, thickness) of the end plate member to the adequate thickness with consideration for the length L1, forming the body to be bundled of a configuration that includes the end plate with the adjusted thickness (that is, setting the length adjusting means), and bundling the body to be bundled so as to obtain the stipulated pressure P and stipulated length LT. The thickness of the end plate may be adjusted (for example, adjusted by a screwing degree in the setscrew mechanism such as described in Example 2 below) to a thickness such that makes it possible to converge the spread in length L1 and to form a body to be bundled of a stacking direction length that constitutes the battery assembly of the stipulated length LT when the body to be bundled is bundled by the stipulated pressure (bundling pressure) P.

The length adjusting means may be an elastic member that is arranged together with the stacked body in the stacking direction and constitutes the body to be bundled. In this case, the bundling step is implemented by selecting an elastic member demonstrating an adequate elastic force (repulsion force) with consideration for the length L1, forming the body to be bundled by using the selected elastic member (that is, setting the length adjusting means), and bundling the body to be bundled so as to obtain the stipulated pressure P and stipulated length LT. More specifically, it is possible to use an elastic member having characteristics such that the spread in length L1 is converged and the repulsion force acting when bundling is conducted to configure the battery assembly of the stipulated length LT (when the elastic member is compressed) becomes the stipulated pressure (bundling pressure) P where the elastic member is arranged together with other constituent elements of the body to be bundled.

The present invention also provides a method for manufacturing a battery assembly in which a predetermined number of unit cells are arranged in a stacking direction, the method including the steps of: preparing (manufacturing or purchasing) a plurality of unit cells and measuring a stacking direction length L1 of a stacked body including the predetermined number of the unit cells arranged in the stacking direction. This manufacturing method includes a step of bundling a body to be bundled that includes the stacked body, so that a bundling pressure of the body to be bundled is a stipulated pressure P. Further, the method includes a step of disposing an externally attached spacer at the outside in the stacking direction of the bundled body that has been bundled by the stipulated pressure P, the externally attached spacer serving to converge a spread in stacking direction length L1 and match the length of the battery assembly in the stacking direction with a stipulated length LT.

With the manufacturing method of such a configuration, an externally attached spacer is used that has an adequate size (stacking direction length, that is, thickness) determined with consideration for the stacking direction length L1 of the stacked body. As described hereinabove, this length L1 can be measured with an accuracy higher than that of the stacking direction length of individual constituent elements. Therefore, it is possible to manufacture a battery assembly in which the bundling pressure and the stacking direction length of the battery assembly match the stipulated values (stipulated length LT and stipulated pressure P) with higher accuracy. Further, the bundling pressure is not applied to the externally attached spacer and the externally attached spacer is not deformed (compression deformation) by the bundling pressure. Therefore, the stacking direction length of the battery assembly can be adjusted with better accuracy. Further, because the operation of measuring successively the thickness of individual unit cells that are used is unnecessary, battery assemblies with well-matched bundling pressure and stacking direction length can be manufactured with good efficiency.

With consideration for the length L1, the externally attached spacer is used that has a size (stacking direction length, that is, thickness) adequate to match the stacking direction length of the battery assembly with the stipulated length LT. More specifically, the externally attached spacer may be used that is configured so that the spread in stacking direction length B of the bundled unit obtained by bundling the body to be bundled by the stipulated bundling pressure P (can be the length reflecting the spread in length L1) can be converged and a stacking direction length necessary to match the stacking direction length of the battery assembly with the stipulated length LT can be added to the body to be bundled.

The present invention also provides a method for manufacturing a battery assembly in which a predetermined number of unit cells are arranged in a stacking direction, comprising the steps of: preparing the predetermined number of unit cells and measuring a stacking direction thickness for each of these unit cells. The method includes a step of forming a body to be bundled that includes the predetermined number of unit cells arranged in the stacking direction. Further, the method includes a step of bundling the body to be bundled so that a length of the battery assembly in the stacking direction is a stipulated length LT and a bundling pressure of the body to be bundled is a stipulated pressure P. In this case, the step of forming the body to be bundled includes a length adjustment processing of converging a spread of a total value CT of stacking direction thicknesses of the predetermined number of unit cells. The length adjustment processing is a processing of arranging one or a plurality (typically, a plurality) of spacing adjusting members that have a total thickness FT corresponding to the total value CT together with the predetermined number of unit cells in the stacking direction. In this processing, the spacing adjusting members are disposed (distributed) between the unit cells so as to obtain a constant stacking pitch of the unit cells.

With the manufacturing method of the above-described configuration, the spacing adjusting members are used that have a total thickness FT which makes it possible to converge the total value CT and realize the stipulated length LT and stipulated pressure P according to the total value CT. As a result, it is possible to provide battery assemblies with well-matched bundling pressure and stacking direction length. When the manufacturing method of the battery assembly further includes a step of connecting the terminals of the bundled unit cells in series or parallel, if the stacking pitch of the unit cells is uneven due to a spread in unit cell thickness, it can result in inconveniences. For example, the terminal connection tools that have been fabricated to predetermined shape and size cannot be used between some of the unit cells. In this case, with the above-described manufacturing method, because the stacking pitch of the unit cells is adjusted to a constant pitch by the spacing adjusting members, the stacking pitch of the unit cells contained in the battery assembly can be made uniform. Therefore, the terminals of unit cells can be efficiently connected by the terminal connection tools that have been fabricated to predetermined shape and size.

The present invention also provides a method for manufacturing a battery assembly in which a predetermined number of unit cells are arranged in a stacking direction, including the steps of: preparing a plurality of unit cells and measuring a stacking direction thickness for each of these unit cells. The method includes a step of classifying the plurality of unit cells into a plurality of thickness ranks with mutually different thickness ranges based on the stacking direction thickness. Further, the method includes a step of selecting the predetermined number of unit cells from one, or two or more thickness ranks from among the plurality of thickness ranks so that the sum total of representative values of the thickness ranks to which the unit cells belong is a stipulated length RT. The method also includes a step of forming a body to be bundled that includes the selected unit cells arranged in the stacking direction. In addition, the method includes a step of bundling the body to be bundled so that a length of the battery assembly in the stacking direction is a stipulated length LT and a bundling pressure of the body to be bundled is a stipulated pressure P. In this method, the stipulated length RT in the unit cell selection step is set to a length corresponding to the stipulated length LT and stipulated pressure P.

With this manufacturing method, the predetermined number of unit cells are selected such that the spread in thickness of individual unit cells is absorbed and the total thickness of these unit cells converges to the stipulated thickness RT. Therefore, by adequately (that is, so as to obtain the stipulated thickness RT) combining and arranging a plurality of unit cells having a spread in thickness, it is possible to manufacture a battery assembly with the stipulated stacking direction length LT and bundling pressure P with higher accuracy even when the degree of thickness spread (shape accuracy) of the unit cells is at the conventional level. This is useful from the standpoint of production cost of unit cells. Further, in this manufacturing method, the stacking direction length LT at the bundling pressure P is adjusted by combining the unit cells selected from thickness ranks and no novel components are necessary to implement the method. The resultant advantage is that it is not necessary to increase the number of parts constituting the battery assembly.

In any of the above-described methods for manufacturing a battery assembly, unit cells that are prepared by a step of constructing a plurality of unit cells of the same shape, each unit cell including an electrode body in which a positive electrode sheet and a negative electrode sheet are laminated together with a separator sheet, a container that accommodates the electrode body and an electrolyte, and a positive electrode terminal and a negative electrode terminal that are electrically connected to the positive electrode and the negative electrode and are disposed outside the container, can be advantageously used as the plurality of unit cells. The step of constructing the plurality of unit cells can include a processing in which one, or two or more of positive electrode sheets, negative electrode sheets, and separator sheets to be used to form the electrode bodies are selected from a plurality of positive electrode sheets, a plurality of negative electrode sheets, and a plurality of separator sheets that have been classified into a plurality of thickness ranks based on the sheet thickness and the electrode bodies are formed by using the selected positive electrode sheets, negative electrode sheets, and separator sheets. In this case, the sheets to be used to form the electrode bodies are selected from one, or two or more thickness ranks from among the plurality of thickness ranks, so that the sum total of representative values of the thickness ranks to which these sheets belong is a stipulated thickness ST.

In the unit cells that have thus been prepared (by manufacturing the unit cells by the above-described process or purchasing the unit cells manufactured by the above-described process), the sheets are selected such that the spread in thickness of individual sheets (electrode sheets of positive and negative electrodes and separator sheets that are used to form the electrode bodies) is absorbed and the total thickness of these sheets is converged to the stipulated thickness ST. Therefore, by adequately combining a plurality of sheets having a spread in thickness, it is possible to reduce a spread in thickness in the sheet lamination direction in an electrode body of a laminated type in which the sheets are laminated and an electrode body of a wound type (wound electrode body) in which the laminated sheets are wound, even when the degree of thickness spread in sheets is at the conventional level. By so reducing the spread in thickness of the electrode bodies, it is possible to reduce the spread in thickness of unit cells in which the electrode bodies are accommodated in containers. Therefore, by using such unit cells it is possible to manufacture a battery assembly having the stipulated stacking direction length LT and bundling pressure P with better accuracy.

The effect of the present invention, which is in the possibility of manufacturing a battery assembly having the stipulated stacking direction length LT and bundling pressure P with better accuracy by adequately selecting the sheets constituting the electrode bodies and reducing the spread in thickness of unit cells, can be advantageously applied to a method for manufacturing a battery assembly of a mode including a step of measuring the stacking direction thickness for each of these unit cells and/or a step of measuring the stacking direction length L1 of the stacked body, and also to a method for manufacturing a battery assembly of a mode that does not require these steps. Therefore another aspect of the present invention relates to a method for manufacturing a battery assembly in which a predetermined number of unit cells are arranged in a stacking direction, including the steps of: constructing a plurality of unit cells of the same shape, each unit cell including an electrode body in which a positive electrode sheet and a negative electrode sheet are laminated together with a separator sheet, a container that accommodates the electrode body and an electrolyte, and a positive electrode terminal and a negative electrode terminal that are electrically connected to the positive electrode and the negative electrode and are disposed outside the container; forming a body to be bundled that includes the predetermined number of unit cells arranged in the stacking direction; and bundling the body to be bundled so that a length of the battery assembly in the stacking direction is the stipulated length LT and a bundling pressure of the body to be bundled is a stipulated pressure P. In this case, the step of constructing the plurality of unit cells includes a processing in which one, or two or more of positive electrode sheets, negative electrode sheets, and separator sheets to be used to form the electrode bodies are selected from a plurality of positive electrode sheets, a plurality of negative electrode sheets, and a plurality of separator sheets that have been classified into a plurality of thickness ranks based on the sheet thickness and the electrode bodies are formed by using the selected positive electrode sheets, negative electrode sheets, and separator sheets. Further, the sheets to be used to form the electrode bodies are selected from one, or two or more thickness ranks from among the plurality of thickness ranks, so that the sum total of representative values of the thickness ranks to which these sheets belong is a stipulated thickness ST.

Another preferred example of the unit cells that can be used in any of the methods for manufacturing a battery assembly disclosed herein relates to unit cells prepared by a step of constructing a plurality of unit cells of the same shape, each unit cell including an electrode body in which a positive electrode sheet and a negative electrode sheet are laminated together with a separator sheet, a container that accommodates the electrode body and an electrolyte, and a positive electrode terminal and a negative electrode terminal that are electrically connected to the positive electrode and the negative electrode and are disposed outside the container. The step of constructing the plurality of unit cells includes a processing in which a lamination direction thickness of an electrode body of a standard configuration that is predicted from the sheet thickness of the positive electrode sheet, negative electrode sheet, and separator sheet to be used to form the electrode body is compared with a stipulated electrode body thickness (target value of the electrode body thickness measured in the stacking direction of the unit cells including the electrode body) E, and the electrode body is formed to match the stipulated electrode body thickness E by increasing or decreasing the amount of the separator sheet used with respect to the standard configuration.

By so increasing or decreasing the amount of the separator sheet to match the stipulated electrode body thickness E, it is possible to form electrode bodies of more uniform thickness (small spread) and therefore the spread in thickness of unit cells in which the electrode body is accommodated in the container can be reduced. Therefore, by using such unit cells, it is possible to manufacture the battery assembly having the stipulated stacking direction length LT and bundling pressure P with better accuracy. The increase or decrease in the amount of the separator sheet used can be performed for example by increasing or decreasing the number of the separator sheet so as to match the stipulated electrode body thickness E. Further, in an electrode body of a wound type (wound electrode body), this increase or decrease can be performed by winding the separator sheet in excess on the outer circumference (winding end portion) of the electrode body so as to match the stipulated electrode body thickness E. Alternatively, the separator sheet may be wound in excess on the inner circumference (winding start portion) of the electrode body.

The effect of the present invention, which is in the possibility of reducing the spread in thickness of unit cells and manufacturing a battery assembly having the stipulated stacking direction length LT and bundling pressure P with better accuracy by adequately increasing or decreasing the amount of separator sheets used can be advantageously applied to a method for manufacturing a battery assembly of a mode including a step of measuring the stacking direction thickness for each of these unit cells and/or a step of measuring the stacking direction length L1 of the stacked body, and also to a method for manufacturing a battery assembly of a mode that does not require these steps. Therefore another aspect of the present invention relates to a method for manufacturing a battery assembly in which a predetermined number of unit cells are arranged in a stacking direction, including the steps of: constructing a plurality of unit cells of the same shape, each unit cell including an electrode body in which a positive electrode sheet and a negative electrode sheet are laminated together with a separator sheet, a container that accommodates the electrode body and an electrolyte, and a positive electrode terminal and a negative electrode terminal that are electrically connected to the positive electrode and the negative electrode and are disposed outside the container; forming a body to be bundled that includes the predetermined number of unit cells arranged in the stacking direction; and bundling the body to be bundled so that a length of the battery assembly in the stacking direction is the stipulated length LT and a bundling pressure of the body to be bundled is a stipulated pressure P. In this case, the step of constructing the plurality of unit cells includes a processing in which a lamination direction thickness of an electrode body of a standard configuration that is predicted from the sheet thickness of the positive electrode sheet, negative electrode sheet, and separator sheet to be used to form the electrode body is compared with a stipulated electrode body thickness E, and the electrode body is formed to match the stipulated electrode body thickness E by increasing or decreasing the amount of the separator sheet used with respect to the standard configuration.

Another preferred example of the unit cells that can be used in any of the methods for manufacturing a battery assembly disclosed herein relates to unit cells prepared by a step of constructing a plurality of unit cells of the same shape, each unit cell including an electrode body in which a positive electrode sheet and a negative electrode sheet are laminated together with a separator sheet, a container that accommodates the electrode body and an electrolyte, and a positive electrode terminal and a negative electrode terminal that are electrically connected to the positive electrode and the negative electrode and are disposed outside the container. The step of constructing the plurality of unit cells includes a processing in which a lamination direction thickness of the electrode body is measured and one or a plurality of gap filling materials are disposed in the lamination direction of the electrode body between the electrode body and an inner wall of the container according to the measured value of the lamination direction thickness, thereby adjusting the combined lamination direction thickness of the electrode body and the gap filling materials to a stipulated value A.

By so adjusting the combined thickness of the body (in this case, the electrode body and the gap filling material) that will be accommodated in the container to the stipulated value A, it is possible to form electrode bodies with more uniform thickness (smaller spread in thickness) and reduce a spread in thickness of the unit cells that will be thereafter obtained by accommodating the electrode bodies in the containers. Therefore, by using such unit cells, it is possible to manufacture a battery assembly having the stipulated stacking direction length LT and bundling pressure P with better accuracy. For example, fillers formed in sheets can be advantageously used as the gap filling material, and the total thickness of the electrode body and gap filling material can be easily adjusted to match the stipulated value A by increasing or decreasing the number of gap filling material sheets that are used.

As described hereinabove, the battery assembly manufactured by any of the above-disclosed methods excels in stable quality and therefore can be advantageously used as a battery assembly for installation on a vehicle (for example, a battery for a motor (electric motor) of a vehicle such as an automobile). Therefore, the present invention provides a vehicle equipped with any of the battery assemblies disclosed herein.

BEST MODE FOR CARRYING OUT THE INVENTION

Figure 1:
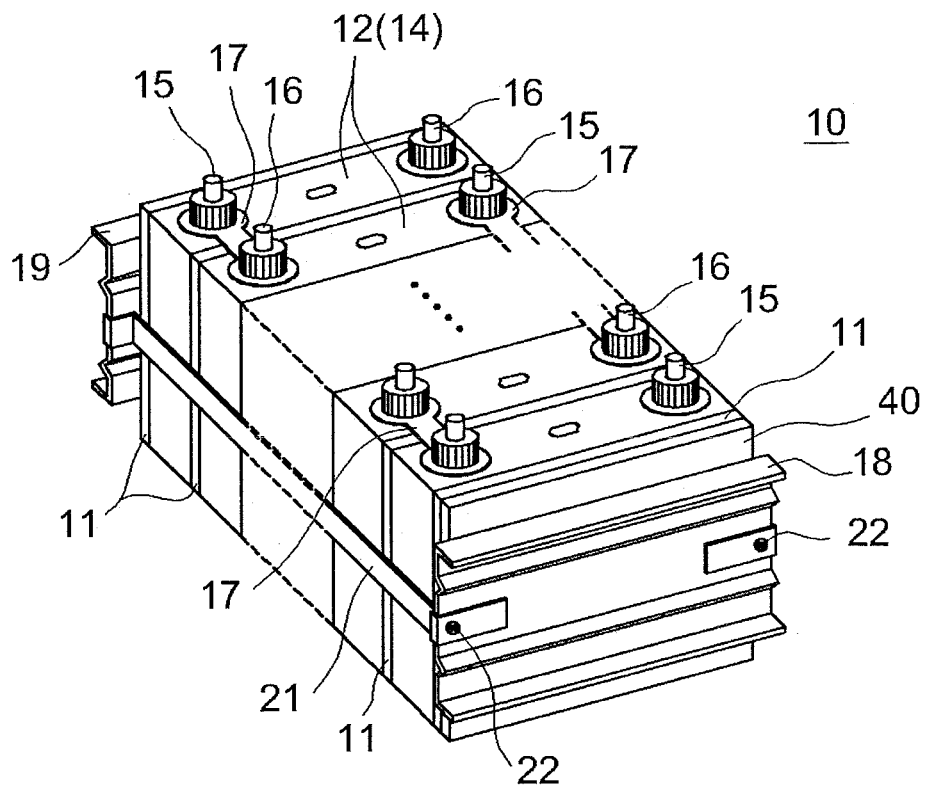
FIG. 1 is a perspective view illustrating the configuration of a battery assembly of Example 1.

The preferred embodiments of the invention will be described below. A matter other than the subject specifically referred to in the present description, but necessary to carry out the invention (for example, methods for manufacturing a positive electrode, a negative electrode, and a separator, configurations thereof, a method for bundling the unit cells, and a method for installing a battery assembly on a vehicle) may be understood as a design matter for a person skilled in the art on the basis of a related art in the pertinent field. The present invention can be implemented on the basis of the contents disclosed in the present description and general technical knowledge in the pertinent field.

In the battery assembly manufactured by applying the technique disclosed herein, the configuration of each unit cell is not particularly limited, provided that the battery assembly has the unit cells (typically unit cells having a flat outer shape) that are arranged and bundled in the arrangement direction (stacking direction). Examples of unit cells that are preferred as the application objects of the present invention include secondary batteries such as nickel-hydrogen batteries and electric double layer capacitors. Among them, the present invention can be advantageously employed as a method for manufacturing a battery assembly using a lithium ion battery as a unit cell. Because the lithium ion battery is a secondary battery that can realize a high output at a high energy density, such a battery can be used to construct a high-performance battery assembly, in particular a battery assembly (battery module) for installation on a vehicle. Further, the present invention is advantageous as a method for manufacturing a battery assembly of a configuration in which a plurality of such arranged unit cells are connected in series or parallel (typically, in series).

The present invention will be described below in greater detail by the example in which a flat-shaped lithium ion battery is used as a unit cell and a battery assembly is manufactured in which a plurality of such unit cells are connected in series. In the drawings, members and components demonstrating like actions will be assigned with like reference numerals and the redundant explanation thereof is omitted or simplified.

Example 1

Similarly to a unit cell provided in the conventional battery assembly, a unit cell used as a constituent element of the battery assembly manufactured in each of the below-described embodiments typically includes an electrode body composed of predetermined constituent material of the battery (active materials of positive and negative electrodes, collectors of positive and negative electrodes, separator, etc.) and a container that accommodates the electrode body and an appropriate electrolyte.

Figure 2:
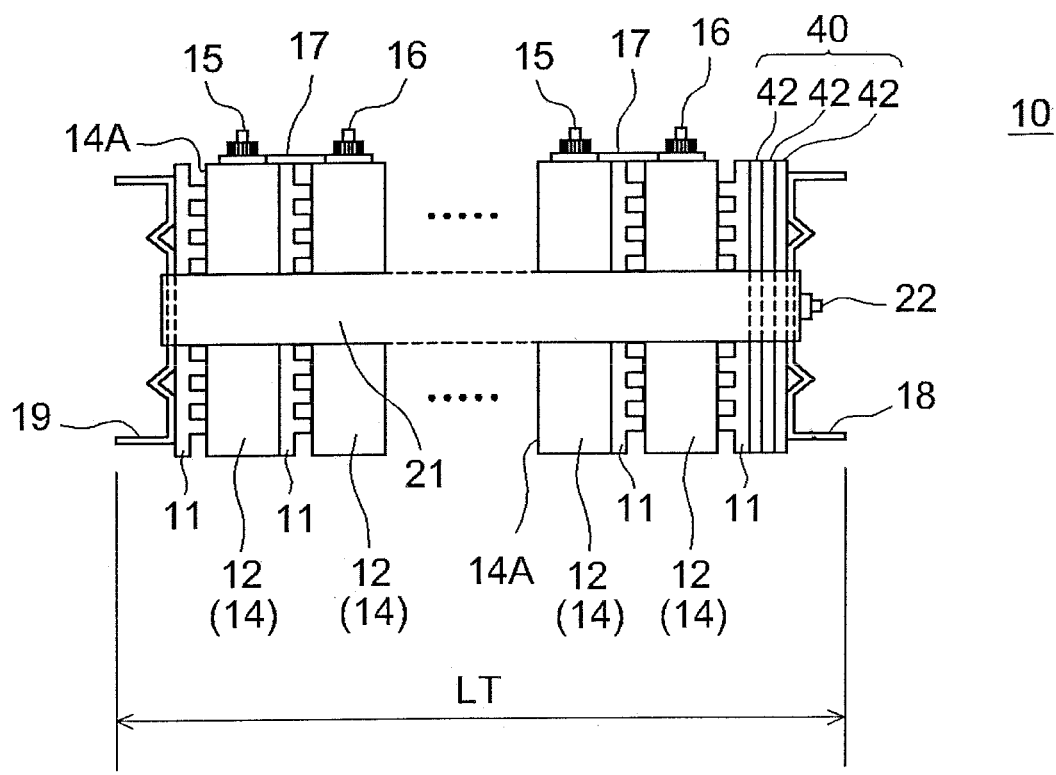
FIG. 2 is a side view illustrating the configuration of a battery assembly of Example 1.

As an example, as shown in FIG. 1 and FIG. 2, a battery assembly 10 of the present example includes a predetermined number (typically 10 or more, preferably about 10 to 30, for example, 20) unit cells 12 of the same shape. The unit cell 12 has a container 14 of a shape (in the present embodiment, a flat box-like shape) that can accommodate the below-described flat-shaped wound electrode body. The "same shape" of the unit cells 12 means that the cells have been manufactured to the same target dimensions and does not necessarily mean that the dimensions of each portions are absolutely identical. The side of portions of the unit cells 12 (for example, the external shape such as thickness in the stacking direction) can have a spread due to a dimensional error in the manufacture of the container 14 used.

The container 14 is provided with a positive electrode terminal 15 for electric connection to the positive electrode of the wound electrode body and a negative electrode terminal 16 for electric connection to the negative electrode of the electrode body. As shown in the figure, the positive electrode terminal 15 of one of the adjacent unit cells 12 is electrically connected to the negative electrode terminal 16 of the other of the adjacent unit cells with a connection tool 17. The battery cell 10 of a desired voltage is thus constructed by connecting the unit cells 12 in series.

Similarly to the conventional unit cell container, a safety valve for releasing the gas generated inside the container can be provided in the container 14. The configuration of such a container 14 does not by itself characterizes the present invention and therefore the detailed explanation thereof is omitted.

The material of the container 14 is not particularly limited, provided that it is identical to the material used in the conventional until cells. For example a metallic (for example, aluminum or steel) container, a synthetic resin (for example, a polyolefin resin such as polypropylene or a high-melting resin such as polyethylene terephthalate, polytetrafluoroethylene, and a polyamide resin) container can be used. The container 14 in the present example is made, for example, from aluminum.

As shown in FIG. 1 and FIG. 2, a plurality of unit cells 12 of the same shape are arranged in the direction facing a wide plane 14A of the container 14 (that is, a plane facing a flat plane of the below-described wound electrode body 30 accommodated inside the container 14), while inverting every other unit cell so that the positive electrode terminals 15 and negative electrode terminals 16 of the unit cells are disposed alternately. Cooling plates 11 of a predetermined shape are disposed in a state of intimate contact with the wide plane 14A of the container 14 between the arranged unit cells 12 and at both outer sides in the unit cell arrangement direction (stacking direction). The cooling plates 11 function as heat dissipating members serving to dissipate efficiently the heat generated inside the unit cells in use. The cooling plates have a frame shape (for example, a concave-convex shape, as viewed from the side surface, such as a comb-like shape shown in the figure) that enables the introduction of a cooling fluid (typically, the air) between the unit cells 12. Cooling plates 11 made from a metal with good thermal conductivity or a lightweight and hard synthetic resin such as polypropylene can be advantageously used.

A pair of end plates 18, 19 are disposed further outside of the cooling plates 11 disposed at both outer sides of the arranged until cells 12 and cooling plates 11 (referred together hereinbelow as "unit cell group"). A spacer member 40 serving as length adjusting means is inserted between the cooling plate 11 and end plate 18 disposed at one (right end in FIG. 2) outer side of the unit cell group. The spacer member 40 is constituted by one or a plurality of stacked (three are shown in FIG. 2) sheet-like spacers (spacer sheets) 42. The constituent material of the spacer members 40 (spacer sheets 42) is not particularly limited and various materials (metallic materials, resin materials, ceramic materials, and the like) can be used, provided that they can demonstrate the below-described length adjusting function. From the standpoint of endurance against impacts, the use of metallic materials or resin materials is preferred. For example, the spacer member 40 made from a lightweight polyolefin resin can be advantageously used. In the present example, polypropylene sheets of the same thickness (typically a thickness of 0.03 mm to 3 mm, preferably 0.1 mm to 1 mm) are used as the spacer sheets 42.

The entire body (referred to hereinbelow as "body to be bundled") 20 composed of the unit cell groups, spacer members 40, and end plates 18, 19 arranged in the stacking direction of the unit cells 12 is bundled by a stipulated bundling pressure P in the stacking direction of the body to be bundled, using a bundling band 21 for tightening that is wrapped around so as to bridge both end plates 18, 19. More specifically, as shown in FIG. 2, the end portions of the bundling band 21 are tightened and fixed to the end plate 18 with screws 22, whereby the body 20 to be bundled is bundled so that a stipulated bundling pressure P (for example such that a surface pressure received by the wall surface of the container 14 is about $2\times10^6$ to $5\times10^6$ Pa) is applied in the arrangement direction of the body to be bundled. The length (in the example shown in FIGS. 1 and 2, the length between the outer ends of the end plates 18 and 19) in the stacking direction of the battery assembly 10 bundled by such a stipulated bundling pressure P is a stipulated length LT.

With the manufacturing method of the present example, as will be described hereinbelow, the battery assembly 10 having the above-described configuration can be manufactured with good efficiency so as to realize the stipulated bundling pressure P and stipulated length LT with good stability. This manufacturing method will be explained below with reference to schematic diagrams shown in FIGS. 3 to 6.

First, a step of preparing the predetermined number of unit cells 20 that will be used to construct the battery assembly 10 will be described. Similarly to a wound electrode body of the usual lithium ion battery, the until cell 20 has a flat-shaped wound electrode body 30 fabricated by laminating a sheet-like positive electrode 32 (can be also referred to hereinbelow as "positive electrode sheet 32"), a sheet-like negative electrode 34 (can be also referred to hereinbelow as "negative electrode sheet 34"), and a total of two sheet-like separators 36 (referred to hereinbelow as "separator sheets 36"), winding, while somewhat shifting the positive electrode sheet 32 and negative electrode sheet 34, and then flattening the obtained wound body from the side surface direction thereof.

Figure 3:
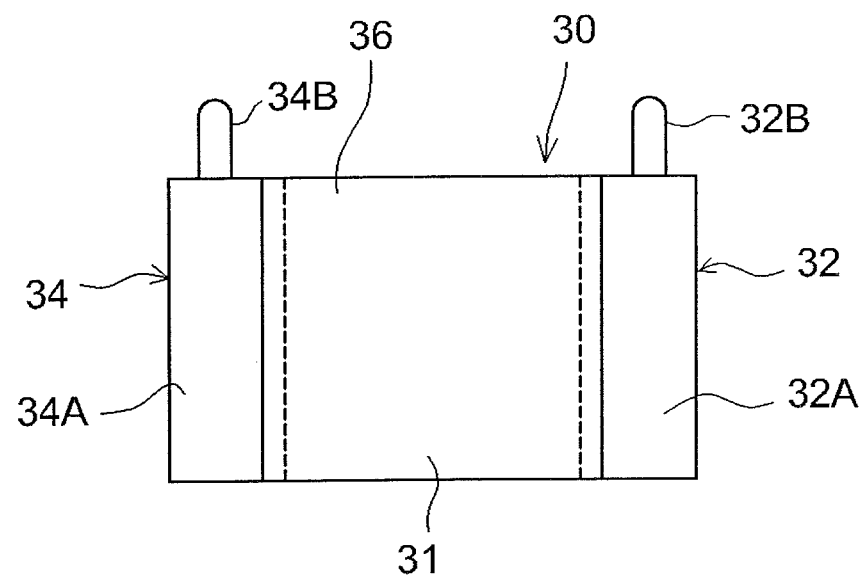
FIG. 3 is a plan view illustrating schematically an example of a wound electrode body.

As shown in FIG. 3, as a result of winding with the above-described shift in the transverse direction with respect to the winding direction of this wound electrode body 30, end parts of the positive electrode sheet 32 and negative electrode sheet 34 protrude to the outside from a wound core portion 31 (that is, a portion obtained by tightly winding a positive electrode active material layer formation portion of the positive electrode sheet 32, a negative electrode active material layer formation portion of the negative electrode sheet 34, and the separator sheet 36). A positive electrode lead terminal 32B and a negative electrode lead terminal 34B are attached to a positive electrode protruding portion (that is, a portion that does not form the positive electrode active material layer) 32A and a negative electrode protruding portion (that is, a portion that does not form the negative electrode active material layer) 34A, and these lead terminals 32B, 34B are electrically connected to the aforementioned positive electrode terminal 15 and negative electrode terminal 16, respectively.

The materials constituting the wound electrode body 30 and the members themselves are not particularly restricted and may be identical to those of the electrode body of the conventional lithium ion battery. For example, the positive electrode sheet 32 can be formed by providing a positive electrode active material layer for a lithium ion battery on an elongated positive electrode collector. An aluminum foil (present embodiment) or other metal foil suitable for the positive electrode can be advantageously used for the positive electrode collector. One, or two or more substances that have been conventionally used in lithium ion batteries can be used without any particular limitation for the positive electrode active material. The preferred examples include lithium transition metal oxides such as $LiMn_2O_4$, $LiCoO_2$, and $LiNiO_2$. For example, the advantageous positive electrode sheet 32 can be obtained by using an aluminum foil with a length of about 2 m to 4 m (for example 2.7 m), a width of about 8 cm to 12 cm (for example, 10 cm), and a thickness of about 5 μm to 20 μm (for example, 15 μm) as the collector, and forming a positive electrode active material layer (for example, lithium nickel oxide 88 wt. %, acetylene black 10 wt. %, polytetrafluoroethylene 1 wt. %, and carboxymethyl cellulose 1 wt. %) for a lithium ion battery that is based on a lithium nickel oxide by the usual method on the predetermined region of the collector surface.

The negative electrode sheet 34 can be formed by providing a negative electrode active material layer for a lithium ion battery on an elongated negative electrode collector. A copper foil (present embodiment) or other metal foil suitable for the negative electrode can be advantageously used for the negative electrode collector. One, or two or more substances that have been conventionally used in lithium ion batteries can be used without any particular limitation for the negative electrode active material. The preferred examples include carbon-containing materials such as graphite carbon and amorphous carbon, lithium transition metal oxides, and transition metal nitrides. For example, the advantageous negative electrode sheet 34 can be obtained by using a copper foil with a length of about 2 m to 4 m (for example 2.9 m), a width of about 8 cm to 12 cm (for example, 10 cm), and a thickness of about 5 μm to 20 μm (for example, 10 μm) as the collector, and forming a negative electrode active material layer (for example, graphite 98 wt. %, styrene-butadiene rubber 1 wt. %, and carboxymethyl cellulose 1 wt. %) for a lithium ion battery that is based on graphite by the usual method on the predetermined region of the collector surface.

The preferred separator sheet 36 used between the positive and negative electrode sheets 32, 34 is constituted for example by a porous polyolefin resin. For example, a porous separator sheet from a synthetic resin (for example, a polyolefin such as polyethylene) with a length of about 2 m to 4 m (for example 3.1 m), a width of about 8 cm to 12 cm (for example, 11 cm), and a thickness of about 5 μm to 30 μm (for example, 25 μm) can be advantageously used. When a solid electrolyte or a gelled electrolyte is used as the electrode, the separator is sometimes unnecessary (that is, in this case, the electrolyte itself can function as the separator).

Figure 4:
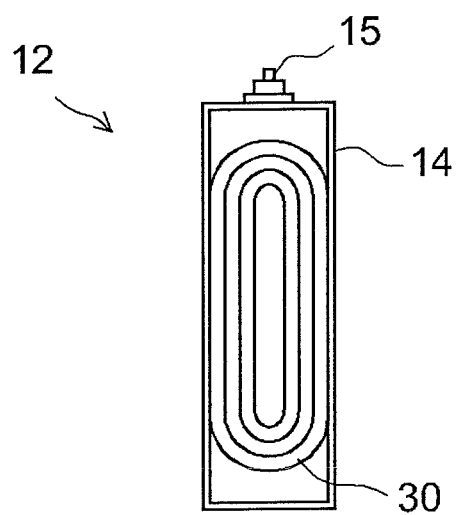
FIG. 4 is a cross-sectional view illustrating schematically a configuration of unit cells of the battery assembly of Example 1.

The flat-shaped wound electrode body 30 thus obtained is accommodated inside the container 14 so that the winding axis is side toppled as shown in FIG. 4, a nonaqueous electrolyte (electrolytic solution) such as a mixed solvent (for example, a mass ratio of 1:1) of diethyl carbonate and ethylene carbonate including an appropriate amount (for example, a concentration of 1 M) of an appropriate support salt (for example, a lithium salt such as $LiPF_6$) is poured in, and the container is sealed to produce the unit cell 12.

Figure 5:
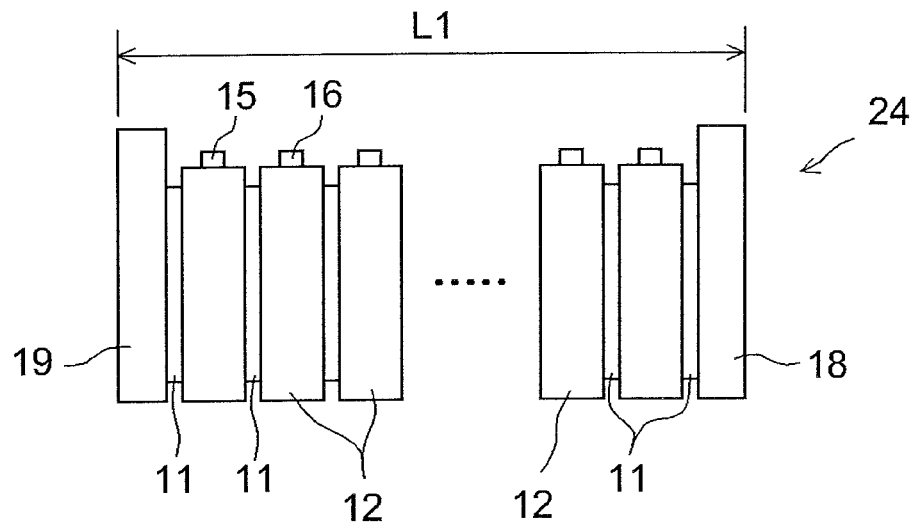
FIG. 5 is a side view illustrating schematically a method for manufacturing the battery assembly of Example 1.

Then, as shown schematically in FIG. 5, the predetermined number of unit cells 12 to be used in the manufacture of the battery assembly 10 are arranged in the stacking direction together with the predetermined number (the number sufficient to dispose the cooling plates between the unit cells 12 and at both outer sides of the arrangement) of cooling plates 11 used in the manufacture of the battery assembly 10. Then, end plates 18, 19 are disposed at both ends of the arrangement. The stacking direction length L1 of the unit cells—cooling plates—end plates stacked body 24 that is configured as described hereinabove is measured and the measured value obtained (length L1 of the stacked body 24 in the stacking direction) is compared with the target value L0 of the stacking direction length of the body 20 to be bundled that has been set in advance. The target value L0 is set so as to configure a battery assembly of a stipulated stacking direction length LT by bundling the body 20 to be bundled that has the stacking direction length L0 with the stipulated bundling pressure P, in order words, so as to realize the stipulated bundling pressure P by wrapping around the bundling band 21 of a shape and size that enable the configuration of the battery assembly with the stipulated stacking direction length LT to the above-described body 20 to be bundled (that is, the body having the stacking direction length L0). The target value L0 can be set on the basis of past results obtained in the process of manufacturing battery assemblies or can be readily found by preliminary tests.

As described hereinabove, the thickness of the predetermined number of unit cells 12 typically has a spread caused for example by a dimensional error in the manufacture of the containers 14 that will be used. Therefore, the stacking direction length L1 of the stacked body 24 that includes the predetermined number of unit cells 12 arranged in the stacking direction has a spread reflecting the spread in thickness of these unit cells 12. A spacer member (length adjusting means) 40 is selected that has a thickness suitable to compensate for the difference between the stacking direction length L1 (actually measured value) of the stacked body 24 and the target value L0 according to the stipulated stacking direction length L1 measured with respect to the stacked body 24 to be used in the manufacture of the battery assembly 10, so as to converge the spread in stacking direction length L1. Thus, FIG. 6 shows an example in which three spacer sheets are used as the spacer member 40, but the thickness of the spacer member 40 (total thickness of the spacer sheets) can be adjusted and the spread in stacking direction length L1 per each stacked body can be converged (absorbed) by increasing or decreasing the number of the spacer sheets used.

By arranging the spacer member 40 selected in the above-described manner in addition to the constituent elements of the stacked body 24 (for example, the spacer member 40 is set between the cooling plate 11 and end plate 18 at the right end of the stacked body 24), it is possible to adjust adequately the stacking direction length of the body 20 to be bundled (has a configuration obtained by adding the spacer member 40 to the stacked body 24). The body 20 to be bundled is then bundled by wrapping around the bundling band 21 so as to create the stipulated bundling pressure P. Because the stacking direction thickness of the body 20 to be bundled is matched with the target value L0, the body 20 to be bundled can be adequately bundled by using the bundling band 21 of the same size (size corresponding to the stacking direction length LT), regardless of the stacking direction length L1 of the stacked body 24. The battery assembly 10 having the stipulated bundling pressure P and stipulated stacking direction length LT can thereafter be manufactured with good stability by connecting the positive electrode terminals 15 and negative electrode terminals 16 of the adjacent unit cells 12 with the connection tools 17. Thus, with the present manufacturing method, it is possible to provide with good efficiency the battery assemblies 10 with the bundling pressure and stacking direction length that are well matched.

In a case where the unit cell 12 has a configuration in which the thickness can be easily changed (for example, the thickness can be easily reduced by flexural deformation of the container 14) by the pressure in the stacking direction (for example, the pressure similar to the bundling pressure P), or in a case where any of other constituent element (cooling plates 11, end plates 18, 19) contained in the stacked body 24 can be easily induced to change the thickness by the pressure in the stacking direction, the stacking direction length L1 of the stacked body 24 may be measured in a state in which a compressive stress (typically, a pressure corresponding to the bundling pressure P) is applied in the stacking direction to the stacked body 24. As a result, the stacking direction length obtained when the finally obtained battery assembly 10 is bundled by the bundling pressure P can be more accurately matched with the stipulated length LT.

Figure 6:
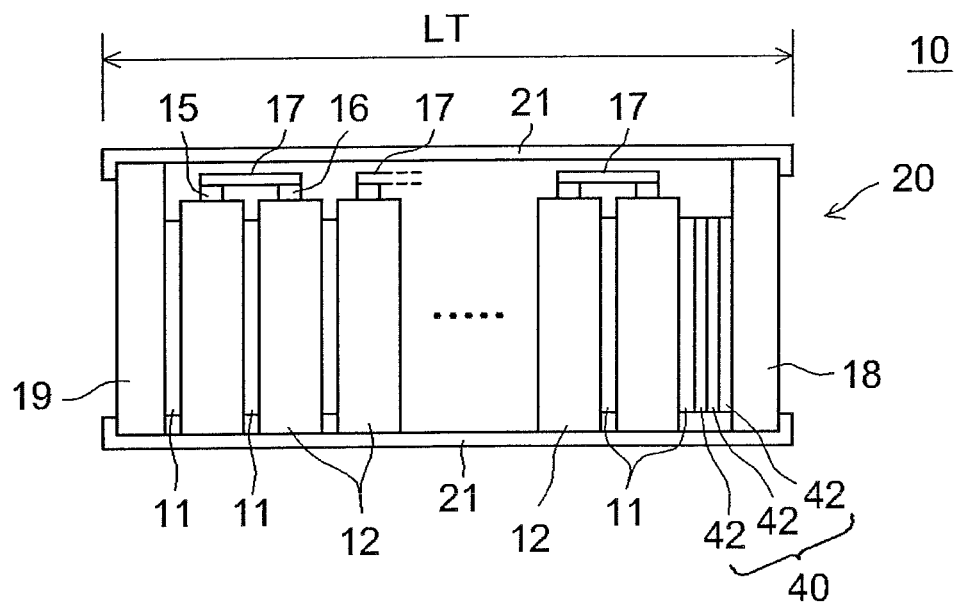
FIG. 6 is a side view illustrating schematically a method for manufacturing the battery assembly of Example 1.

In the example shown in FIG. 6, the spacer member 40 is disposed at one outer side of the unit cell group, but the spacer member 40 may be also inserted for example in an almost central portion of the unit cell group. Further, in the example shown in FIG. 6, all the components of the spacer member 40 (that is, the three spacer sheets 42) are disposed together, but the spacer sheets 42 may be also disposed separately in various portions of the body 20 to be bundled.

Among the constituent elements for the body 20 to be bundled, the arrangement order of the constituent elements contained in the stacked body 24 (unit cells 12, cooling plates 11, and end plates 18, 19) is preferably identical to the arrangement order of the constituent elements of the stacked body 24 at the time the stacking direction length L1 is measured. In such a case, the battery assembly 10 having the stipulated bundling pressure P and the stipulated stacking direction length LT can be manufactured with better stability.

As shown in FIG. 5, instead of measuring the stacking direction length L1 of the stacked body 24 in which the predetermined number of unit cells 12, cooling plates 11, and end plates 18, 19 are arranged, it is possible, for example, to measure the stacking direction length L1 of the stacked body of unit cells in which only the predetermined number of unit cells 12 are stacked and adjust the thickness of the spacer member 40 according to the stacking direction length L1. More specifically, for example, it is possible to compare the stacking direction length L1 of the stacked body of unit cells and the total thickness (can have a spread reflecting the stacking direction length L1 of the stacked body of unit cells) of the predetermined number of cooling plates 11 and the end plates 18, 19 contained in the body 20 to be bundled, with the target value L0 of the stacking direction length of the body 20 to be bundled, and to select the thickness of the spacer member 40 so as to converge the spread in the total thickness and compensate the thickness of the target value L0. Such an approach can be advantageously used in the case in which the spread in stacking direction thickness of the cooling plates 11 and end plates 18, 19 is sufficiently small to be ignored. Further, the manufacturing method of the present example can be also implemented in a mode in which the stacking direction length L1 of the stacked body of only the unit cells 12 is measured. Therefore, such a method can be also advantageously applied to manufacturing a battery assembly 10 of a configuration in which no cooling plates 11 are disposed between the unit cells 12 (for example, a battery assembly in which cooling air passages are formed between the adjacent unit cells 12 by using convex grooves provided in the wide surface 14A of the container 14).

Example 2

In the present embodiment, length adjusting means of a configuration different from that of the spacer member 40 in Example 1 is used as length adjusting means for converging the spread in stacking direction length L1 of the stacked body.

Figure 8:
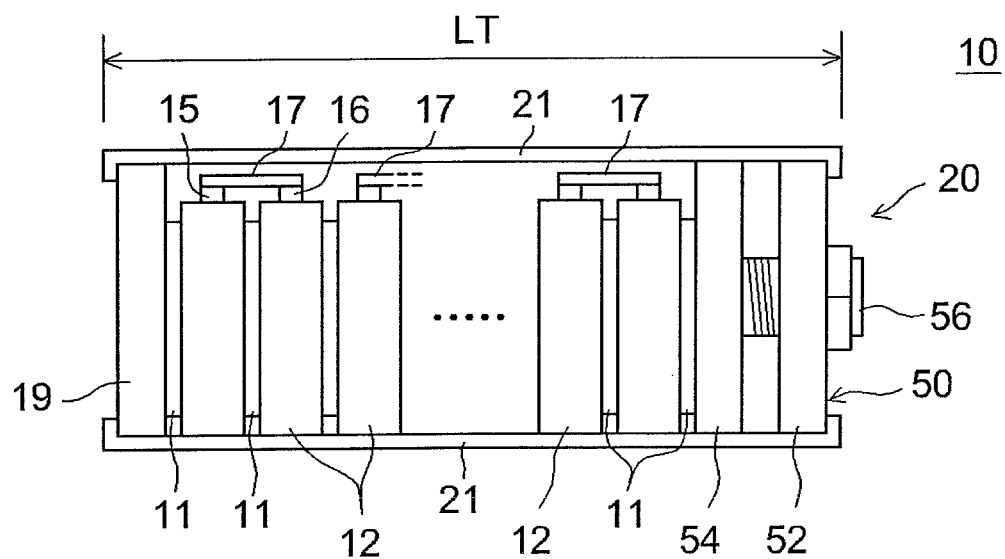
FIG. 8 is a side view illustrating schematically a method for manufacturing the battery assembly of Example 2.

As shown schematically in FIG. 8, a battery assembly 10 of the present example includes a unit cell group composed of a predetermined number of unit cells 12 that have a structure similar to that described in Example 1 and cooling plates 11 disposed between the unit cells 12 and also at both outer sides in the stacking direction of the unit cells, end plates 50, 19 disposed in intimate contact with the cooling plates 11 arranged at both outer side of the unit cell group, and a bundling band 21 that bundles a body 20 to be bundled that is composed of the unit cell group and the end plates 50, 19 in the stacking direction. The battery assembly 10 is so configured that the body 20 to be bundled is bundled by the stipulated bundling pressure P and the length in the stacking direction is a stipulated length LT. A thickness adjusting mechanism that adjusts the thickness of the plate 50 in the stacking direction is provided in the end plate 50 disposed at one end (right end in FIG. 8) of the unit cell group. The end plate (length adjusting means) 50 of the present example includes two parallel plate-shaped outer plate 52 and inner plate 54 and a bolt 56 that is provided through the outer plate 52 and connected by a distal end thereof to the inner plate 54, and the end plate is configured so that the distance between the plates 52, 54 can be adjusted by the tightening degree of the bolt 56 (setscrew mechanism). The configuration of other components is identical to that of the battery assembly 10 of Example 1.

Figure 7:
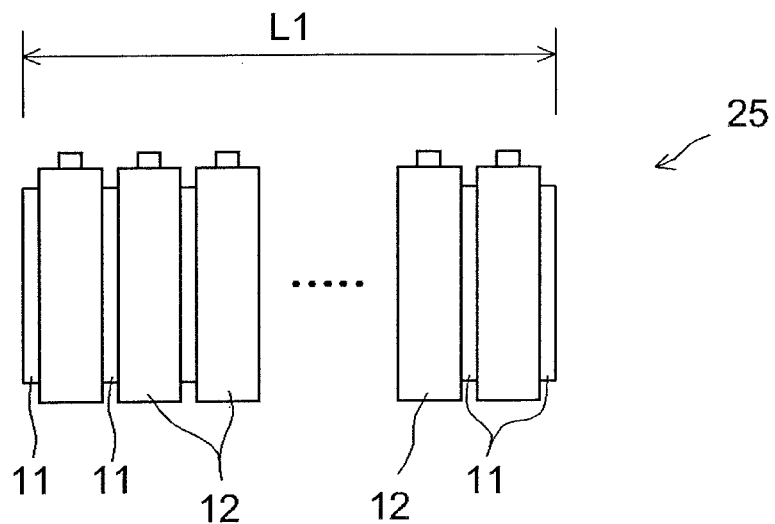
FIG. 7 is a side view illustrating schematically a method for manufacturing the battery assembly of Example 2.

With the manufacturing method of the present example, the battery assembly 10 having the above-described configuration is manufactured in the following manner. Thus, as shown schematically in FIG. 7, a stacked body (unit cell group) 25 is configured in which the predetermined number of unit cells 12 and the cooling plates 11 disposed between the unit cells 12 and at both outer sides are arranged, and the stacking direction length L1 of the stacked body 25 is measured. The sum total of the measured value obtained (stacking direction length L1 of the stacked body 25) and the thickness of the end plate 18 shown in FIG. 8 is compared with a target value L0 of the stacking direction length of the body 20 to be bundled that has been set in advance (similarly to Example 1, the target value L0 is set so as to configure a battery assembly of a stipulated stacking direction length LT by bundling the body 20 to be bundled that has the stacking direction length L0 with the stipulated bundling pressure P, therefore so as to realize the stipulated bundling pressure P by wrapping around the bundling band 21 of a shape and size that enable the configuration of the battery assembly with the stipulated length LT to the body 20 to be bundled), and the thickness required for the end plate 50 to compensate for the difference between the compared values is found. In this case, similarly to Example 1, the stacking direction length of the stacked body 25 has a spread reflecting the spread in thickness of the unit cells 12 contained in the stacked body 25. Therefore, the thickness of the end plate 50 is adjusted so as to converge (absorb) this spread and obtain the battery assembly 10 having the stipulated bundling pressure P and stacking direction length LT. The body 20 to be bundled is configured by arranging the end plate 19 and the end plate 50 with the thickness adjusted according to the measurement result of the length L1 at both outer sides of the stacked body 25. The battery assembly 10 having the stipulated bundling pressure P and stipulated stacking direction length LT can be manufactured with good stability and efficiency by bundling the body 20 to be bundled with the bundling band 21 and then connecting the positive electrode terminals 15 and negative electrode terminals 16 of the adjacent unit cells 12 with the connection tools 17. Further, because the stacking direction length of the bundled body 20 matches the target value L0, the body 20 to be bundled can be adequately bundled by using the bundling band 21 of the same size, regardless of the spread in stacking direction length L1 of the stacked body 25.

Instead of forming the body 20 to be bundled by using the end plate 50 with a thickness adjusted in advance as described hereinabove, it is also possible to form the body 20 to be bundled by using the end plate 50 that has not been adjusted to the final thickness (rough thickness adjustment may be performed to obtain a thickness that is clearly less than the supposed necessary thickness), bundle the body 20 to be bundled with the bundling band 21 so as to obtain the stacking direction length LT, and then match the bundling pressure of the body 20 to be bundled with the stipulated bundling pressure P by using the thickness adjusting mechanism of the end plate 50 (in this case, by adjusting the tightening degree of the bolt 56). The advantage of such an approach is that the process of adjusting the tightening degree of the bolt 56 can be conducted by a torque control.

Example 3

In the present embodiment, length adjusting means of a configuration different from that of the spacer member 40 in Example 1 is used as length adjusting means for converging the spread in stacking direction length L1 of the stacked body.

Figure 9:
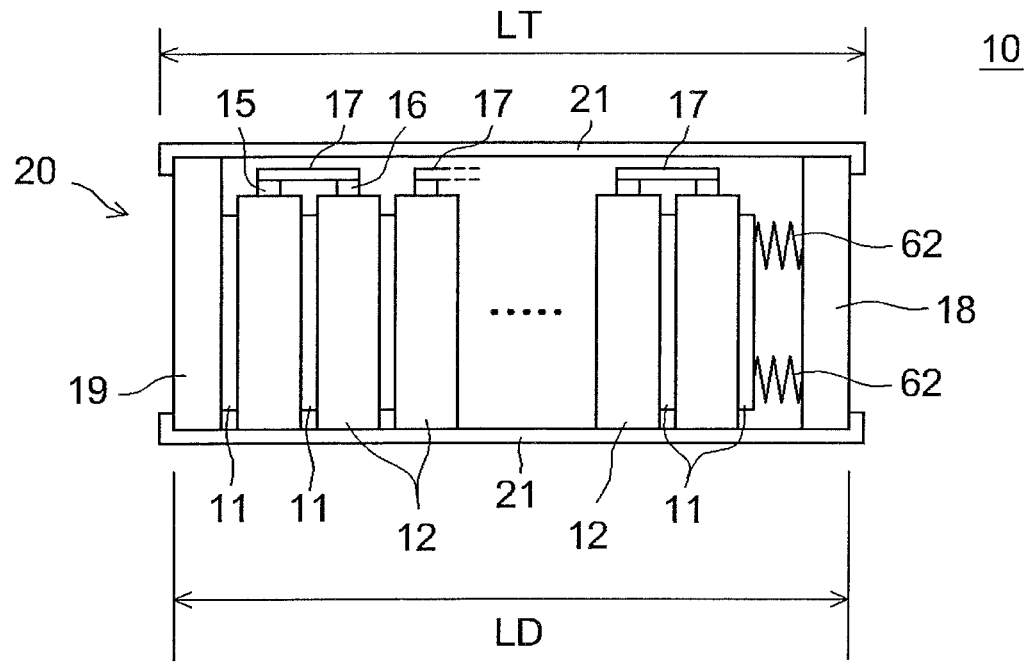
FIG. 9 is a side view illustrating schematically a method for manufacturing the battery assembly of Example 3.

As shown schematically in FIG. 9, a battery assembly 10 of the present example includes a unit cell group composed of a predetermined number of unit cells 12 that have a structure similar to that described in Example 1 and cooling plates 11 disposed between the unit cells 12 and also at both outer sides in the stacking direction of the unit cells, a pair of end plates 18, 19 disposed further outside of the unit cell group, elastic members 62 disposed between the end plate 18 and the cooling plate 11 disposed on one outer side (right end in FIG. 9) of the unit cell group, and a bundling band 21 that bundles the aforementioned components (that is, a body 20 to be bundled that is composed of the unit cell group, end plates 18, 19, and elastic members 62). The configuration of other components is identical to that of the battery assembly 10 of Example 1.

With the manufacturing method of the present example, the battery assembly 10 having the above-described configuration is manufactured in the following manner. In other words, the stacking direction length L1 of a stacked body 24 is measured, the stacked body 24 being obtained by arranging, in the stacking direction, the predetermined number of unit cells 12 and the cooling plates 11 that are used in the manufacture of the battery assembly 10 and then disposing the end plates 18, 19 at both ends of the arrangement thus obtained as shown schematically in FIG. 5. The obtained measured value L1 is compared with a distance LD between the inner ends of the bundling tool (in this case, a bundling band 21) that abuts against the body 20 to be bundled, where the bundling tool is used so as to realize a stipulated length LT. Further, as shown in FIG. 9, elastic members 62 are selected such that have properties making it possible to converge (absorb) the spread in stacking direction length L1 of the stacked body 24 and demonstrate a repulsion force corresponding to the stipulated bundling pressure P when the elastic members are compressed to a thickness corresponding to a difference (LD−L1) between the distance LD and the stacking direction length L1. The body 20 to be bundled in which the elastic members 62 are arranged in addition to the constituent elements of the stacked body 24 is bundled with the bundling band 21 so as to obtain the stipulated stacking direction length LT. Thus, the battery assembly 10 having the stipulated bundling pressure P and stipulated stacking direction length LT can be manufactured with good stability and efficiency. Further, because the stacking direction length L1 of the stacked body 24 can be absorbed to a degree of elastic deformation of the elastic member 62, the body 20 to be bundled can be adequately bundled by using the bundling band 21 of the same size, regardless of the spread in length L1.

The configuration of the elastic member 62 is not particularly limited. For example, a spring (plate spring, coil spring, and the like) having the desired spring constant or an elastic material (a molded body of a dense or porous structure that is composed of an elastomer material such as rubber or urethane) molded to a predetermined shape can be used. In the present embodiment, a plate spring is used as the elastic member 62.

Example 4

In the present embodiment, an example is described in which length adjusting means (length adjusting member) for absorbing the spread in stacking direction length L1 of the stacked body and adjusting the stacking direction length of the battery assembly is disposed on the outside in the stacking direction of the body to be bundled (that is, in a position in which no bundling pressure is applied thereto).

Figure 10:
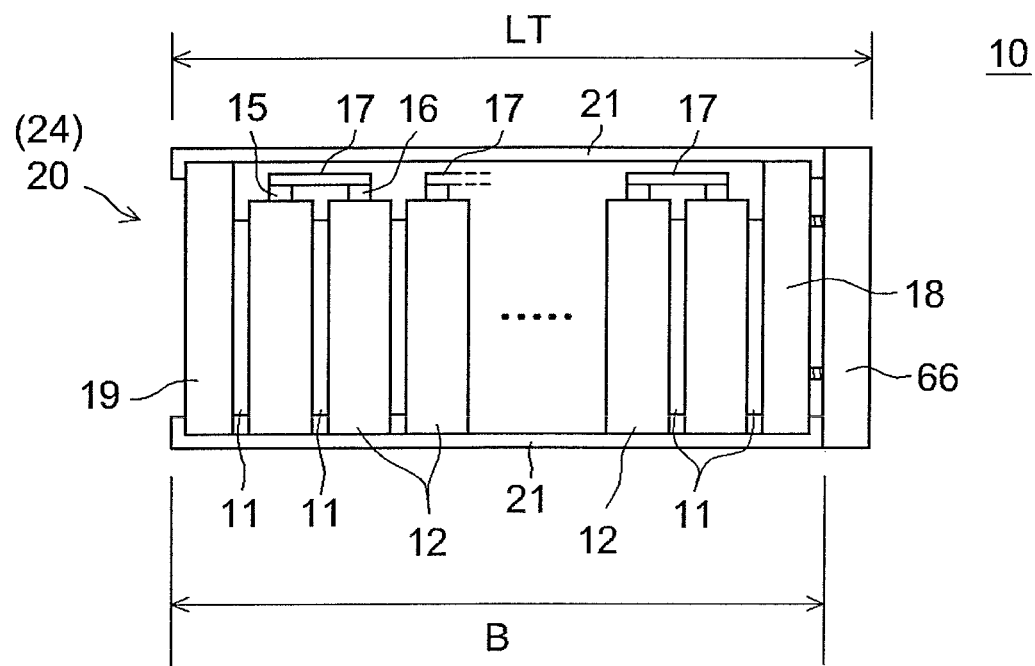
FIG. 10 is a side view illustrating schematically a method for manufacturing the battery assembly of Example 4.

As shown schematically in FIG. 10, the battery assembly 10 of the present example includes a unit cell group that is composed of a predetermined number of unit cells 12 constructed in the same manner as in Example 1 and cooling plates 11 disposed between the unit cells 12 and at both outer sides in the stacking direction thereof, a pair of end plates 18, 19 disposed further on the outside of the unit cell group, a bundling band 21 that bundles the body 20 to be bundled that is composed of the unit cell group and the end plates 18, 19 in the stacking direction, and an externally attached spacer 66 that is disposed on the outside in the stacking direction of the body 20 to be bundled. The configuration of other components is similar to those of the battery assembly 10 of Example 1.

With the manufacturing method of the present example, the battery assembly 10 having the above-described configuration is manufactured in the following manner. Thus, as shown schematically in FIG. 5, a predetermined number of unit cells 12 and cooling plates 11 that are used in the manufacture of the battery assembly 10 are arranged in the stacking direction, end plates 18, 19 are disposed at both side of this arrangement, and a stacking direction length L1 of the stacked body 24 thus obtained is measured. Then, as shown schematically in FIG. 10, the body 20 to be bundled is bundled by the stipulated bundling pressure P by wrapping the bundling band 21 of a size corresponding to the stacking direction length L1 (that is, the size suitable to bundle the stacked body 24 having the stacking direction length L1 by the stipulated bundling pressure P) around the body 20 to be bundled that is composed of the stacked body 24. In this case, the spread in stacking direction length of the stacked body 24 reflects the spread in thickness of unit cells 12 contained in the stacked body 24. Therefore, the stacking direction length B of the bundled unit that is obtained by bundling the stacked body 24 by the bundling pressure P also has a spread. Accordingly, the externally attached spacer 66 is selected that has a stacking direction length necessary to converge (absorb) the spread in stacking direction length B and match the stacking direction length of the battery assembly 10 with the stipulated length LT, and the selected spacer is attached on the outside in the stacking direction of the member (that is, the body 20 to be bundled) that is the object of bundling with the bundling band shown in FIG. 10. In the example shown in FIG. 10, the externally attached spacer 66 is fixed by screwing from the outside of the bundling band 21 to the end plate 18 located at the right end of the body 20 to be bundled. The externally attached spacer 66 may be attached, for example, to the end portion of the bundling band 21.

Thus, the battery assembly 10 having the stipulated bundling pressure P and stipulated stacking direction length LT can be manufactured with good stability and efficiency. With the manufacturing method of the present embodiment, the stacking direction length of the battery assembly can be adjusted with good accuracy, without applying the bundling pressure P to the externally attached spacer 66. Further, because the externally attached spacer 66 is not required to have a pressure withstand strength (rigidity) against the bundling pressure P, the structure and constituent material of the externally attached spacer 66 can be selected from wider ranges (for example, a more suitable range in terms of lightweight and cost).

Example 5

Figure 11:
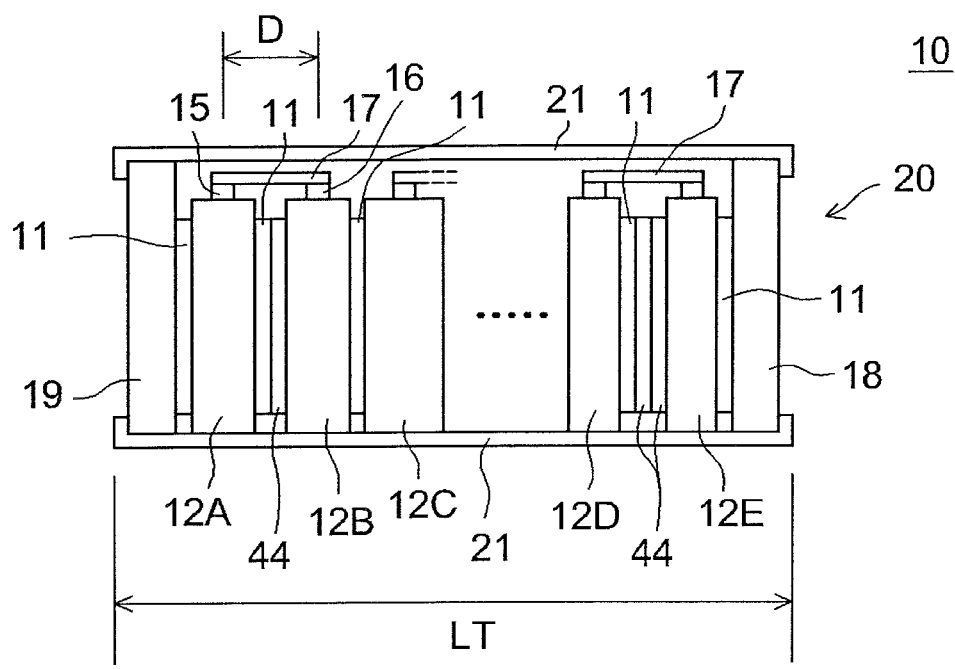
FIG. 11 is a side view illustrating schematically a method for manufacturing the battery assembly of Example 5.

The configuration of a battery assembly 10 of the present example is shown schematically in FIG. 11. The battery assembly 10 of the present example, includes a unit cell group including a predetermined number of unit cells 12 constructed in the same manner as in Example 1, a pair of end plates 18, 19 disposed further on the outside of the unit cell group, and a bundling band 21 that bundles in the stacking direction a body 20 to be bundled that is composed of the unit cell group and end plates 18, 19. In this case, the unit cell group is composed of the predetermined number of unit cells 12, cooling plates 11 that are disposed between the unit cells 12 and at both outer sides thereof in the stacking direction, and a plurality of spacing adjusting members 44 in the form of thin sheets. The battery assembly 10 is configured so that the body 20 to be bundled is bundled by the stipulated bundling pressure P, the stacking direction length of the battery assembly 10 is a stipulated length LT, and a stacking pitch D of the unit cells 12 is constant. The configuration of other components is similar to those of the battery assembly 10 of Example 1.

With the manufacturing method of the present example, the battery assembly 10 having the above-described configuration is manufactured in the following manner. Thus, individual thickness of the predetermined number of unit cells 12 that will be used to manufacture the battery assembly 10 is measured, and a total value CT of the measured values is found. Further, the individual thickness of cooling plates 11 used in the same battery assembly 10 in which the unit cells 12 will be used is measured (in a case where the spread in thickness of the cooling plates 11 is small, a designed value may be used instead of the actually measured value of the thickness of the cooling plates 11), and a total value DT of the thickness of these cooling plates 11 is found. Then, a value obtained by adding the total value DT (total thickness of the cooling plates 11) and the thickness of the end plates 18, 19 to the total value CT (total thickness of the unit cells 12) is compared with a target value L0 of the stacking direction length of the body 20 to be bundled that has been set in advance (similarly to Example 1, this target value is set such that the battery assembly of the stipulated stacking direction length LT can be configured by bundling the body 20 to be bundled with the stacking direction length L0 by the stipulated bundling pressure P and therefore such that the stipulated bundling pressure P can be realized by wrapping around the body 20 to be bundled the bundling band 21 of a shape and size that make it possible to configure the battery assembly of the stipulated length LT). Then, a total thickness FT of the spacing adjusting member 44 that is used to construct the battery assembly 10 is found according to the total value CT, more specifically, such that the spread in a sum total value of the total value CT, total value DT, and thickness of the end plates 18, 19 is converged (absorbed) and the difference with the target value L0 is compensated. The spacing adjusting member 44 is formed in a thin plate shape of a predetermined thickness, and the total thickness FT can be adjusted by changing the number of the spacing adjusting members used. Usually, a plurality of spacing adjusting members 44 are used for one battery assembly 10.

Then, the unit cells 12, cooling plates 11, end plates 18, 19, and a plurality of spacing adjusting members 44 having a total thickness FT are arranged to form the body 20 to be bundled. In this case, the plurality of spacing adjusting members 44 are distributed in appropriate locations in the stacking direction of the body 20 to be bundled so that the spread in thickness of the two unit cells 12 that are disposed adjacently (and the spread of thickness of cooling plates 11 disposed between these unit cells 12) is converged and the stacking pitch D of the unit cells 12 is made even on the basis of results obtained in measuring the thickness of individual unit cells 12 (preferably, also on the basis of results obtained in measuring the thickness of cooling plates 11). In the example shown in FIG. 11, the unit cell 12 (12A) at the left end and the unit cell 12 (12B) disposed adjacently thereto at the right side therefrom have an about intermediate thickness from among the predetermined number of unit cells constituting the battery assembly 10, and the cooling plate 11 and one spacing adjusting member 44 are disposed between these unit cells 12A, 12B. The unit cell 12 (12C) that is third from the left end has a relatively large thickness due to a spread that has occurred when the containers were manufactured. Therefore, only the cooling plate 11 is disposed between the unit cell 12C and the second unit cell 12B from the left, and no spacing adjusting member 44 is disposed therein. By contrast, in the configuration shown in FIG. 11, the unit cell 12 (12E) at the right end and the unit cell 12 (12D) disposed adjacently thereto at the left side thereof both have a comparatively small thickness. Therefore, two spacing adjusting members 44 are disposed in addition to the cooling plate 11 between these unit cells 12D, E. Thus, the pitch (reflected in the distance between the electrodes of the adjacent unit cells 12) between the unit cells 12A, B, unit cells 12B, C, and unit cells 12D, E is made uniform. Because the stacking pitch D of the unit cells 12 is thus made uniform, with the configuration of the present embodiment, the positive and negative electrode terminals 15, 16 between the adjacent unit cells 12 can be successively connected by using the connection tools 17 of a single predetermined shape. As a result, the battery assembly 10 can be manufactured with good efficiency without conducting a complex connection operation in which the distances between terminals 15, 16 are measured between individual unit cells 12 and the connection tools corresponding to the measured distances are selected and used (or using the connection tools having a mechanism that can adjust the distance between the connection portions of two terminals of positive and negative electrodes and the connection operation is performed, while adjusting the distance between the connection portions of the terminals).

A material identical to that of the spacer member 40 explained in Example 1 can be advantageously used as the structural material of the spacing adjusting member 44. In the present example, polypropylene sheets of the same thickness (typically, 10 µm to 1000 µm, preferably 100 µm to 200 µm) are used as the spacing adjusting members 44.

In the explanation above, a value corresponding to the center of the range of thickness rank is used as the representative value of each thickness rank, but for example an average value of the thicknesses of a plurality of unit cells 12 that belong to each thickness rank may be also used as the representative value of the thickness rank.

Example 6

Figure 12:
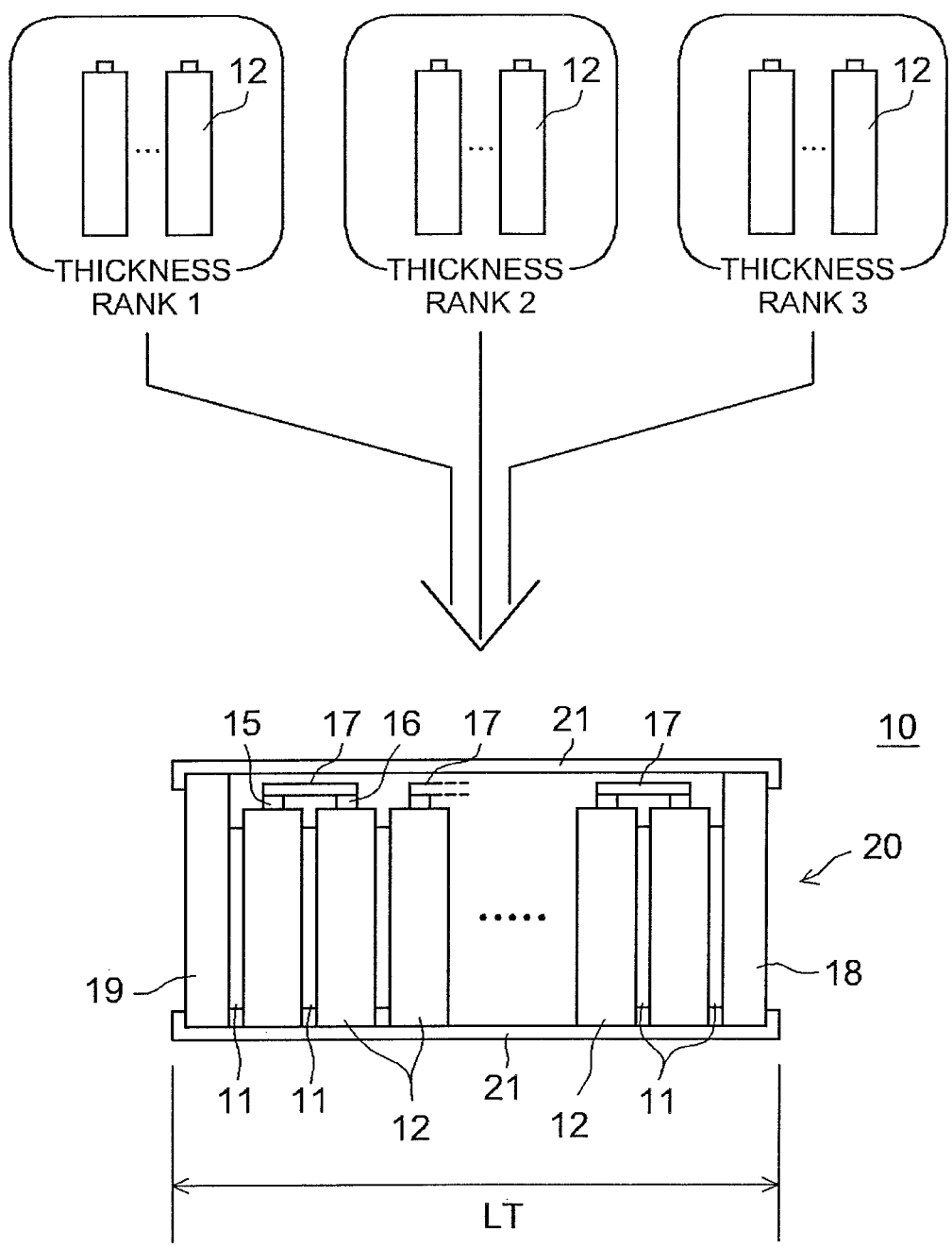
FIG. 12 is an explanatory drawing illustrating schematically a method for manufacturing the battery assembly of Example 6.

A method for manufacturing a battery assembly of the present embodiment will be explained below with reference to FIG. 12. Thus, a stacking direction thickness is measured for each of a large number of unit cells 12, and the large number of unit cells 12 are classified into a plurality of thickness ranks with mutually different thickness ranges according to the measurement results. For example, as shown schematically in FIG. 12, the unit cell 12 for which the stacking direction thickness T is within a range (M−1 µm≤T≤M+1 µm) of the average value M±1 µm of the measured values is classified into a thickness rank 2 for which M is a representative value, the unit cell 12 for which the stacking direction thickness T is within a range M−3 µm≤T<M−1 µm is classified into a thickness rank 1 for which M−2 µm is a representative value, and the unit cell 12 for which the stacking direction thickness T is within a range M+1 µm<T≤M+3 µm is classified into a thickness rank 3 for which M+2 µm is a representative value. The predetermined number of unit cells contained in the battery assembly 10 are then selected from the thickness ranks 1 to 3 in a combination such that the sum total of the representative values of the thickness ranks to which the unit cells belong is the stipulated thickness RT. The stipulated thickness RT is set such that the sum total of the thickness RT and the thickness of other constituent elements constituting the body 10 to be bundled, that is, the predetermined number of cooling plates 11 and end plates 18, 19 is the target value L0 of the stacking direction thickness of the body 20 to be bundled (similarly to Example 1, this target value is set such that the battery assembly of the stipulated stacking direction length LT is constituted by bundling the body 20 to be bundled that has the stacking direction length L0 by the stipulated bundling pressure P and therefore the stipulated bundling pressure P is realized by wrapping around the body 20 to be bundled a bundling band 21 of a shape and size that make it possible to configure the battery assembly of the stipulated length LT).

The body 20 to be bundled is formed by arranging the predetermined number of selected unit cells 12 alternately with the cooling plates 11 and then disposing the end plates 18, 19 at both ends. In this case, the predetermined number of unit cells 12 that will be used is selected such that the spread is eliminated and the total thickness of the unit cells converges to the stipulated length RT, regardless of the spread in thickness of the unit cells 12 that will be used. As a result, the body 20 to be bundled is configured such that the spread in stacking direction length is reduced and the stacking direction length assumes the target value L0. Therefore, by bundling the body 20 to be bundled with the bundling band 21 so as to obtain the stipulated stacking direction length LT, it is possible to manufacture the battery assembly 10 with the stipulated bundling pressure P and stipulated stacking direction length LT with good stability and efficiency. Further, the manufacturing method of the present example makes it possible to decrease the rejection ratio of the unit cells 12 and reduce the production cost of the battery assembly 10 by comparison, for example, with a method in which only the unit cells 12 corresponding to the thickness rank 2 are used to manufacture the battery assembly 10 and the unit cells 12 corresponding to the thickness rank 1 (thin) and thickness rank 3 (thick) are rejected as defective.

The predetermined number of cooling plates 11 contained in the battery assembly 10 also can be classified in a similar manner into a plurality of thickness ranks and the cooling plates 11 that are adequately selected from these thickness ranks to obtain the predetermined total thickness can be combined and used, thereby making it possible to increase further the accuracy of the bundling pressure P and stacking direction length LT of the battery assembly 10.

Example 7

Figure 13:
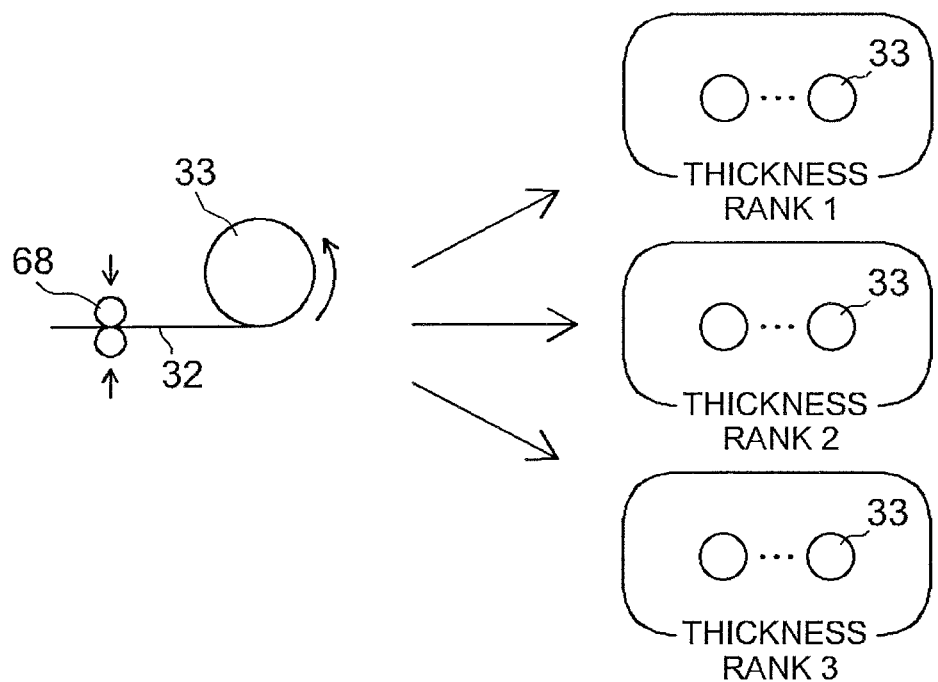
FIG. 13 is an explanatory drawing illustrating schematically a method for manufacturing a unit cell of the battery assembly of Example 7.

A method for manufacturing a battery assembly of the present embodiment will be explained below with reference to FIG. 13 and FIG. 14.

Thus, a positive electrode sheet 32 is fabricated by forming a positive electrode active material layer for a lithium ion battery on an elongated positive electrode collector. For example, a composition in which a material for forming a positive electrode active material that has the positive electrode active material as a main component is dispersed in an appropriate dispersion agent is applied to body surfaces of a positive electrode collector (for example, an aluminum foil) and dried. The configuration obtained is pressed by squeezing between rolls 68 and then wound. This process is repeated to fabricate a plurality of positive electrode rolls 33 in which the positive electrode sheet 32 of a length corresponding to that necessary for a plurality of unit cells 12 is wound in a roll. In this case, the thickness of the positive electrode sheet 32 after pressing is measured as the active material is pressed by the rollers 68, and the plurality of positive electrode rolls 33 are classified based on the measured sheet thickness into a plurality of thickness ranks with mutually different thickness ranges. For example, as shown schematically in FIG. 13, the positive electrode roll 33 for which the sheet thickness T is within a range (M−0.1 μm≤T≤M+0.1 μm) of the average value M±0.1 μm of the measured values is classified into a thickness rank 2 for which M is a representative value, the positive electrode roll 33 for which the stacking direction thickness T is within a range M−0.3 μm≤T<M−0.1 μm is classified into a thickness rank 1 for which M−0.2 μm is a representative value, and the positive electrode roll 33 for which the stacking direction thickness T is within a range M+0.1 μm<T≤M+0.3 μm is classified into a thickness rank 3 for which M+0.2 μm is a representative value.

Figure 14:
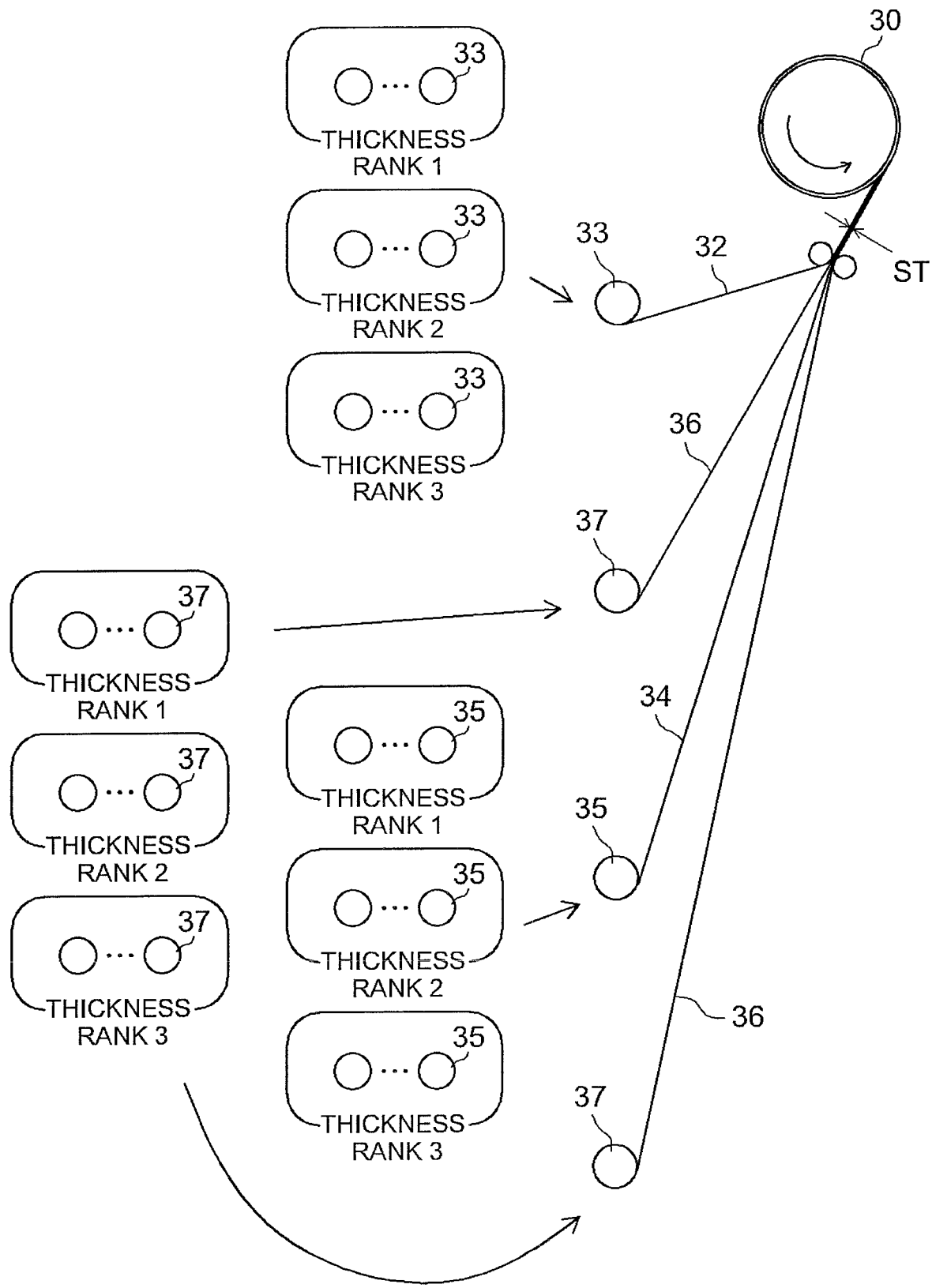
FIG. 14 is an explanatory drawing illustrating schematically a method for manufacturing a unit cell of the battery assembly of Example 7.

Likewise, as shown in FIG. 14, a plurality of negative electrode rolls 35 (obtained by winding into rolls the negative electrode sheets of a length corresponding to that necessary for a plurality unit cells 12) and separator rolls (obtained by winding into rolls the separator sheets of a length corresponding to that necessary for a plurality unit cells 12) 37 that have been classified into respective thickness ranks 1 to 3 are prepared. Then, the positive electrode sheet 32, negative electrode sheet 34, and two separator sheets 36 for fabricating the wound electrode body 30 to be included in each electrode cell 12 contained in the battery assembly 10 are selected in combinations such that the sum total of the representative values of thickness ranks to which these sheets belong is the stipulated thickness ST. In the example shown in FIG. 14, the positive electrode sheet 32 and negative electrode sheet 34 are both selected from the thickness rank 2, whereas one separator sheet is selected from the thickness rank 1 and the other from the thickness rank 3. The selected four sheets, that is, the positive electrode sheet 32, first separator sheet 36, negative electrode sheet 34, and second separator sheet 36 are laminated in the order of description and wound. The wound body obtained is flattened from the side surface direction, thereby producing a flat-shaped wound electrode body 30 (see FIG. 3). In this case, the four sheets used to fabricate the electrode body 30 are selected and combined so that the total thickness (lamination thickness) ST of the representative values of thickness ranks to which the sheets belong has a constant value. As a result, the thickness spread among the individual sheets can be canceled and wound electrode bodies 30 with the thickness well matched in the flattening direction (small spread in thickness) can be manufactured with good stability and efficiency.

Such a decrease in the spread in thickness of the wound electrode bodies 30 makes it possible to reduce a spread in thickness of unit cells in which the electrode body 30 is accommodated in the container 14. By constructing a battery assembly in which such unit cells with a small spread in thickness are arranged in the stacking direction, it is possible to manufacture a battery assembly having the stipulated stacking direction length LT and bundling pressure P with good stability and efficiency. The reduction of spread in thickness of electrode bodies can demonstrate an especially significant effect when a container is used that has a configuration or includes a material such that the thickness can be easily changed by a pressure applied in the stacking direction (for example, a pressure similar to the bundling pressure P). Further, because using such unit cells with a small spread in thickness makes it possible to match effectively the stacking pitches D of the unit cells, the terminals of unit cells can be connected with good efficiency by using connection tools of the same predetermined shape, similarly to the battery assembly of Example 5 and manufacturing method thereof. Measuring the thickness as the positive electrode sheet 32 is manufactured, as shown in FIG. 13, is preferred because the thickness measurement step can be incorporated in the conventional process for manufacturing the positive electrode sheet 32 (for example, a pressing process) and implemented in an in-line mode and no novel step has to be added to measure the thickness.

By using the unit cells with a small spread in thickness that have been obtained by the method of the present example, a battery assembly may be manufactured for example by the above-described manufacturing methods of Examples 1 to 6. Thus, the unit cells manufactured (prepared) by the method according to Example 7 can be advantageously used as the unit cells 12 used in the manufacturing methods of Examples 1 to 6. The battery assembly having the stipulated stacking direction length LT and bundling pressure P can thus be manufactured with even better accuracy.

The total thickness ST of the four aforementioned sheets can be set to form an electrode body with a thickness suitable for accommodation in the container with consideration for a distance in the stacking direction inside the container (distance between the inner walls of the opposing flat surfaces), a length of the sheets used, and a winding diameter of the wound electrode body (before flattening). The ST is preferably set such that no excessive gap remains between the inner wall of the container and the flat surface of the electrode body accommodated in the container and no excessive bulging of the container is caused by the electrode body contained therein.

Example 8

Figure 15:
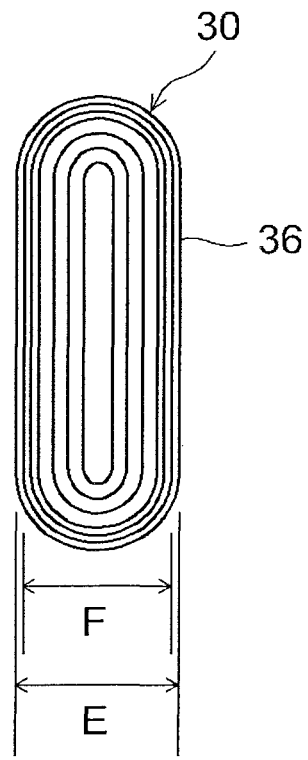
FIG. 15 is an explanatory drawing illustrating schematically a method for manufacturing a unit cell of the battery assembly of Example 8.

A method for manufacturing a battery assembly of the present embodiment will be explained with reference to FIG. 15.

Thus, similarly to the electrode body 30 provided for a unit cell 12 used in Example 1 (see FIG. 4), a flat-shaped wound electrode body 30 is fabricated by laminating the elongated positive electrode sheet, negative electrode sheet, and two separator sheets, winding, and flattening the obtained wound body from the side surface direction. In this case, a stacking direction thickness F of the electrode body (electrode body of standard configuration; can be referred to hereinbelow as "standard electrode body") that is manufactured by the predetermined conditions (inner diameter of the wound body, tension during winding, number of winding turns, etc.) by laminating the aforementioned sheets, that is, the length between the flat surfaces of the electrode body, is predicted from the sheet thickness of the positive electrode sheet, negative electrode sheet, and separator sheets used to fabricate the electrode body 30. The stacking direction thickness F of the standard electrode body can be predicted based on the past results obtained battery assembly manufacture or can be readily found by preliminary testing. Further, for example, similarly to Example 7, the thickness of each sheet can be measured in an in-line mode by incorporating a thickness measurement mechanism in the conventional sheet manufacturing process (for example, electrode sheet pressing process).

The stacking direction thickness F of the standard electrode body is compared with a stacking direction thickness E of a stipulated (target) electrode body, and the amount of the separator sheet used is increased or decreased with respect to that in the configuration of the standard electrode body so as to match the thickness of the electrode body 30 that will be obtained with the electrode body thickness E. For example, in a case in which the stacking direction thickness F of the standard electrode body, which is predicted from the thickness of each sheet used, is somewhat larger than the target electrode body thickness E (this can occur, for example, because the thickness of the positive electrode sheet used is larger than the average value due to a spread in thickness in the positive electrode sheet manufacturing process) in the standard electrode body with a configuration in which only the separator sheet is wound several times (for example, 2 to 3 turns) at the winding end of the electrode body 30, the length of the separator sheet used is decreased and the number of winding turns of the separator sheet at the winding end is reduced. Conversely, in a case in which the stacking direction thickness F of the standard electrode body, which is predicted from the thickness of each sheet used, is somewhat smaller than the target electrode body thickness E (this can occur, for example, because the thickness of the negative electrode sheet used is smaller than the average value due to a spread in thickness in the negative electrode sheet manufacturing process), as in the example shown in FIG. 15, the length of the separator sheet 36 used is increased and the number of winding turns of the separator sheet 36 at the winding end is increased. It is thus possible to manufacture the wound electrode body 30 in which the thickness in the flattening direction is well matched with the target electrode body thickness E (small spread in thickness) with good stability and efficiency.

Such a decrease in the spread in thickness of the wound electrode bodies 30 makes it possible to reduce a spread in thickness of unit cells in which the electrode body 30 is accommodated in the container. By constructing a battery assembly in which such unit cells with a small spread in thickness, it is possible to manufacture a battery assembly having the stipulated stacking direction length LT and bundling pressure P with good stability and efficiency. The reduction of spread in thickness of electrode bodies can demonstrate an especially significant effect when a container is used that has a configuration or includes a material such that the thickness can be easily changed by a pressure applied in the stacking direction (for example, a pressure similar to the bundling pressure P). Further, because using such unit cells with a small spread in thickness makes it possible to match effectively the stacking pitches D of the unit cells, the terminals of unit cells can be connected with good efficiency by using connection tools of the same predetermined shape, similarly to the battery assembly of Example 5 and manufacturing method thereof.

By using the unit cells with a small spread in thickness that have been obtained by the method of the present example, a battery assembly may be manufactured for example by the above-described manufacturing methods of Examples 1 to 6. Thus, the unit cells manufactured (prepared) by the method according to Example 8 can be advantageously used as the unit cells 12 used in the manufacturing methods of Examples 1 to 6. The battery assembly having the stipulated stacking direction length LT and bundling pressure P can thus be manufactured with even better accuracy.

The target electrode body thickness E can be set to obtain a thickness suitable for accommodation in the container with consideration for a distance between the inner walls of the opposing flat surfaces of the container. The target thickness E is preferably set such that no excessive gap remains between the inner wall of the container and the flat surface of the electrode body accommodated in the container and no excessive bulging of the container is caused by the electrode body contained therein. In a simple mode, for example, the distance between the inner walls can be used as the target electrode body thickness E.

Example 9

Figure 16:
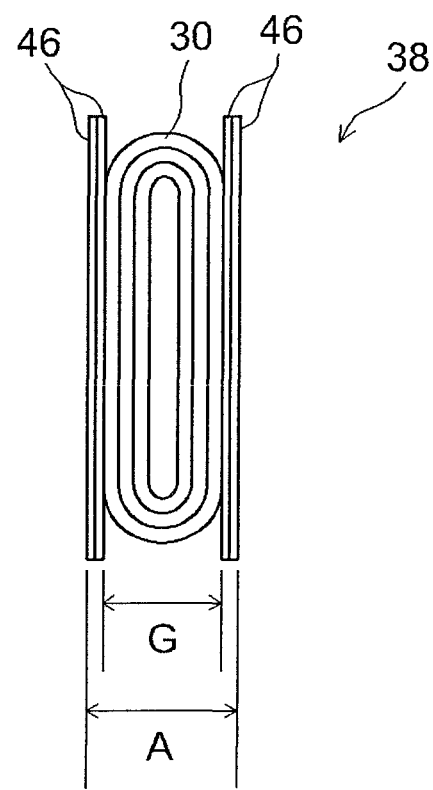
FIG. 16 is an explanatory drawing illustrating schematically a method for manufacturing a unit cell of the battery assembly of Example 9.
Figure 17:
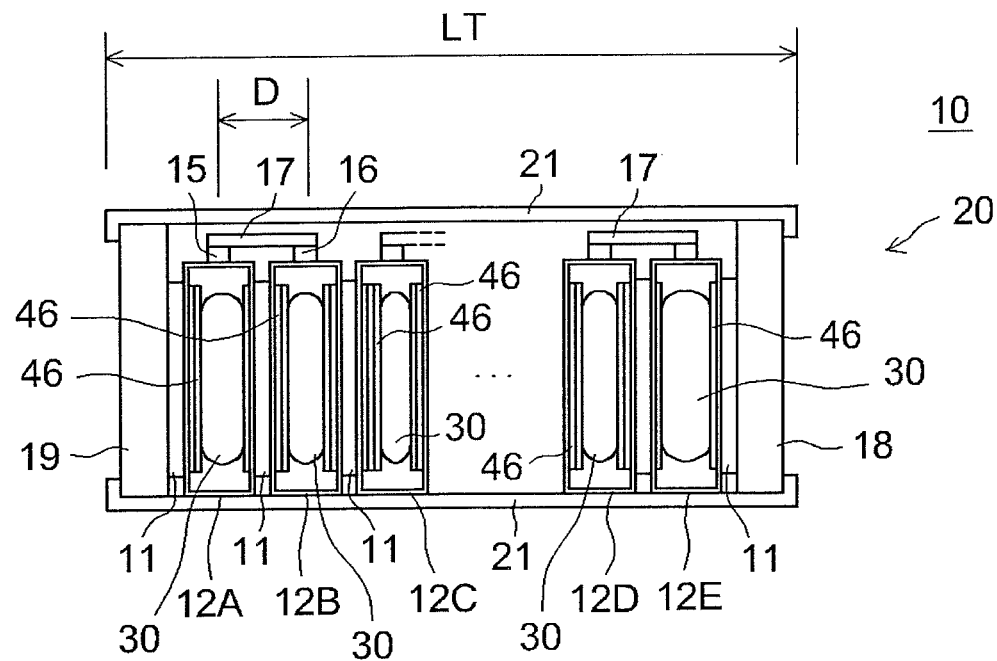
FIG. 17 is an explanatory drawing illustrating schematically a method for manufacturing the battery assembly of Example 9.

A method for manufacturing a battery assembly of the present embodiment will be explained below with reference to FIG. 16 and FIG. 17.

Thus, similarly to the electrode body 30 provided for a unit cell 12 used in Example 1, a flat-shaped wound electrode body 30 is fabricated by laminating the elongated positive electrode sheet, negative electrode sheet, and two separator sheets, winding, and flattening the obtained wound body from the side surface direction. A thickness G of the electrode body 30 thus obtained is measured and compared with a stipulated value (target value) A of the stacking direction thickness of a body 38 that will be accommodated in a container 14. This body 38 to be accommodated is composed of the electrode body 30 and one, or two or more gap filling sheets (gas filling materials) 46 that are placed, if necessary, on the flat surface of the electrode body 30 and accommodated together with the electrode body 30 in the container 14. The stipulated value A is set so as to obtain a thickness suitable for accommodation in the container 14 with consideration for the distance between the inner walls of the opposing flat surfaces of the container 14. The stipulated value A is preferably set such that no excessive gap remains between the inner wall of the container 14 and the flat surface of the body 38 accommodated in the container and no excessive bulging of the container 14 is caused by the body 38 contained therein. In a simple mode, for example, the distance between the inner walls can be used as the target value A of the stacking direction thickness of the body 38 to be accommodated.

The desired number of the gap filling sheets 46 are then placed on the flat surface of the electrode body 30 so that the stacking direction thickness G (measured value) of the electrode body 30 obtained is matched with the target value A. A material similar to the spacer material 40 explained in Example 1 can be advantageously used as the constituent material of the gap filling sheets 46. In the present example, polypropylene sheets of the same thickness (typically 10 μm to 1000 μm, preferably 100 μm to 200 μm) are used as the gap filling sheets 46. In a case where a plurality of the gap filling sheets 46 are used for one electrode body 30, it is preferred that these gap filling sheets 46 be distributed as uniform as possible at both sides in the lamination direction of the electrode body 30. Further, the manufacturing conditions of the electrode body 30 may be adjusted so that the maximum value (MAX value) of the stacking direction thickness G of the electrode body 30 estimated from the thickness spread of the positive electrode sheets, negative electrode sheets, and separator sheets is the target value A (that is, so that the desired number of gap filling sheets 46 is zero when the stacking direction thickness G of the electrode body 30 is the MAX value (=A)). FIG. 17 shows an example in which in the unit cell 12 (12B) second from the left end and the unit cell 12 (12D) second from the right end, two gap filling sheets 46 are disposed on the left and right of the electrode body 30 of an average thickness, in the unit cell 12 (12C) third from the left end, two gap filling sheets 46 are disposed on the right side and three on the left side (a total of five sheets) of the thin electrode body 30, in the unit cell 12 (12A) on the left end, one gap filling sheet 46 is disposed on the right side and two gap filling sheets are disposed on the left side (a total of three sheets) of the thick electrode body 30, and in the unit cell 12 (12E) on the right end, one gap filling sheet 46 is disposed on the left side and one on the right side of even thicker electrode body 30.

Thus, by increasing and decreasing the number of the gap filling sheets 46 used for each unit cell 12 according to the measured value of the stacking direction thickness G of the electrode body 30, it is possible to converge (absorb) the spread in thickness G of the electrode bodies 30 and enable good matching of the stacking direction thickness of the bodies 38 to be accommodated with the target value A. As a result, the spread in thickness of the unit cells 12 in which the body 38 is accommodated in the container 14 can be reduced. By constructing the battery assembly 10 by using such unit cells 12 with a small spread in thickness, it is possible to manufacture the battery assembly 10 having the stipulated stacking direction length LT and bundling pressure P with good stability and efficiency. The reduction of spread in thickness of the bodies 38 to be accommodated can demonstrate an especially significant effect when a container 14 that has a configuration or includes a material such that the thickness can be easily changed by a pressure applied in the stacking direction (for example, a pressure similar to the bundling pressure P) is used as the container. Further, because using such unit cells 12 with a small spread in thickness makes it possible to match effectively the stacking pitches D of the unit cells 12, the terminals of the unit cells 12 can be connected with good efficiency by using connection tools 17 of the same predetermined shape, similarly to the battery assembly of Example 5 and manufacturing method thereof.

The configurations described herein by way of examples can be used in appropriate combinations. For example, the battery assembly 10 may be manufactured by the manufacturing methods of Examples 1 to 6 by using the unit cells 12 with a small thickness spread that have been obtained by the method of Example 9. Thus, the unit cells 12 manufactured (prepared) by the method of Example 9 can be advantageously used as the unit cell 12 for use in the manufacturing methods of Examples 1 to 6. The battery assembly 10 having the stipulated stacking direction length LT and bundling pressure P can thus be manufactured with even better accuracy. Further, Example 3 (configuration using an elastic member) may be combined with Example 5 (configuration using a spacing adjusting member). As a result, it is possible to obtain a constant stacking pitch D of unit cells and realize the stipulated bundling pressure P with high accuracy.

Further, in the above-described examples (e.g., Example 3), the stacking direction length is measured with respect to the electrode body including a total predetermined number (for example, 20) of unit cells constituting the battery assembly, but the number of unit cells arranged during the measurements is not limited thereto and may be the number that can allow (converge) the dimensional spread. For example, the stacking direction length may be measured for some (for 5, for 10, etc.) of the unit cells constituting the battery assembly. The methods for manufacturing a battery assembly that are disclosed herein can include such as an aspect.

Several preferred embodiments of the battery assembly manufacturing method in accordance with the present invention and the battery assemblies that can be manufactured by these methods are explained hereinabove in detail, but the present invention is not intended to be limited to these specific embodiments.

For example, in the above-described embodiments, the electrode body 30 is accommodated in the container 14 in an orientation such that the winding axis of the wound electrode body 30 is a transverse direction (the direction in the thickness of paper sheet in FIG. 2) of the unit cell 12, but the electrode body 30 may be also disposed so that the winding axis is the height direction (up down direction in FIG. 2) of the unit cell 12. Further, an electrode body of a laminated type in which a plurality of positive electrode sheets and a plurality of positive electrode sheets are alternately laminated together with separator sheets may be used instead of the electrode bodies 30 of a wound type. The invention disclosed herein can be advantageously applied to a battery assembly in which a plurality of unit cells in which electrode bodies having various configurations are accommodated in containers (in particular, unit cells in which electrode bodies of a wound type or a laminated type are accommodated in containers with an orientation such that the sheets constituting the electrode bodies are laminated in the stacking direction of the unit cells) are arranged in the stacking direction.

Further, the type of unit cells constituting the battery assembly is not limited to the above-described lithium ion battery, and the unit cells may be batteries of various contents that differ in the electrode body constituent material or electrode, for example, lithium secondary batteries that use metallic lithium or a lithium alloy as a negative electrode, nickel hydrogen batteries, nickel cadmium batteries, and electric double layer capacitors.

The battery assembly 10 shown in FIG. 1 has a simple configuration in order to explain the present invention, but it is obvious to a person skilled in the art that a variety of modifications or additional installations can be made without departing from the scope of features and effect of the present invention. For example, in a case of installation on a vehicle such as an automobile, an external cover for protecting the main components (unit cell group, etc.) of the battery assembly, a part for fixing the battery assembly to the predetermined site of the vehicle, and a part for joining a plurality of battery assembled (battery modules) to each other can be installed, and the presence or absence of such installations does not affect the technical scope of the present invention.

INDUSTRIAL APPLICABILITY

Figure 18:
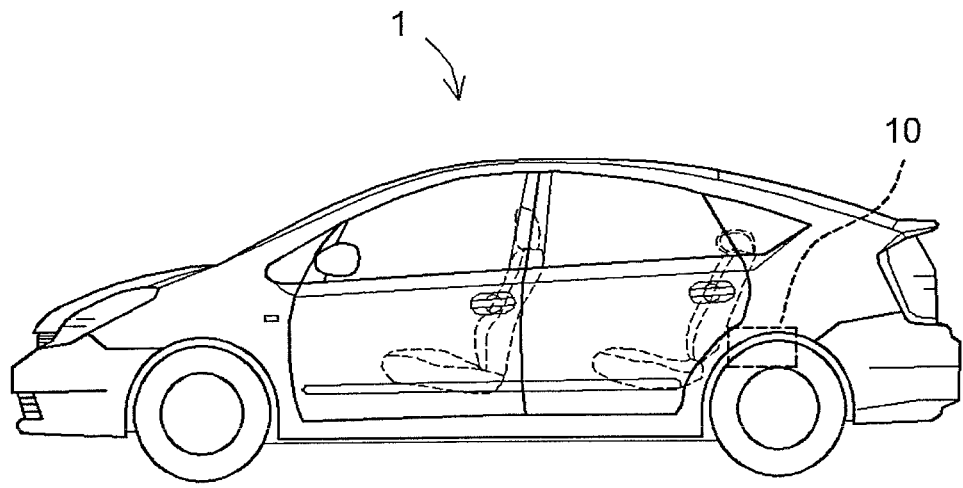
FIG. 18 is a side view illustrating schematically a vehicle (automobile) equipped with a battery assembly.

The battery assembly in accordance with the present invention can be advantageously used as a power source for a motor (electric motor) installed on a vehicle such as an automobile. Therefore, the present invention provides a vehicle (typically, an automobile, in particular an automobile equipped with an electric motor, such as a hybrid vehicle, an electric vehicle, and a fuel cell vehicle) 1 provided with this battery assembly 10 as a power source as shown schematically in FIG. 18.

The invention claimed is:

1. A battery assembly comprising:
    a plurality of flat rectangular shaped unit cells connected in series; and
    a plurality of connection tools,
    each of the flat rectangular shaped unit cells including:
        a flat rectangular shaped electrode body having a positive electrode sheet and a negative electrode sheet being wound together with a separator,
        a flat rectangular shaped container having the electrode body,
        one or more rectangular shaped gap filling sheets placed on a flat surface of the flat rectangular shaped electrode body in the flat rectangular shaped container, each of the rectangular shaped gap filling sheets having a thickness in a range of from 100 μm to 200 μm and being smaller than an inner wall of an opposing flat rectangular shaped surface of the container,
        a positive electrode terminal electrically connected to the positive electrode sheet, and
        a negative electrode terminal electrically connected to the negative electrode sheet, wherein
    the plurality of flat rectangular shaped unit cells are arranged in the direction in which a flat surface of the flat rectangular shaped electrode body of one of the plurality of unit cells faces to a flat surface of the flat rectangular shaped electrode body of another one of the plurality of unit cells laying side-by-side, and
    each of the connection tools has the same predetermined shape and is disposed outside the container and connects the positive electrode terminal of one of the plurality of unit cells to the negative electrode terminal of another one of the plurality of unit cells laying side-by-side,
    the plurality of flat rectangular shaped unit cells comprises at least a first cell and a second cell,
    both of
        a combined thickness of the flat rectangular shaped electrode body and the one or more gap filling sheets placed on the flat surface of the flat rectangular shaped electrode body in the first cell and
        a combined thickness of the flat rectangular shaped electrode body and the one or more gap filling sheets placed on the flat surface of the flat rectangular shaped electrode body in the second cell
    correspond with a predetermined target value,
    both of a thickness of the flat rectangular shaped electrode body in the first cell and a thickness of the flat rectangular shaped electrode body in the second cell are less than the predetermined target value, and the thickness of the flat rectangular shaped electrode body in the first cell is different from the thickness of the flat rectangular shaped electrode body in the second cell, and
    the number of the gap filling sheets in the first cell is different from the number of the gap filling sheets in the second cell.

2. The battery assembly according to claim 1, wherein the rectangular shaped gap filling sheets are constructed of polypropylene.

3. The battery assembly according to claim 1, wherein all of the rectangular shaped gap filling sheets in the first cell and the second cell have the same thickness.

4. A vehicle comprising the battery assembly according to claim 1.

* * * * *